US011961487B2

(12) United States Patent
Kobashi et al.

(10) Patent No.: US 11,961,487 B2
(45) Date of Patent: Apr. 16, 2024

(54) DISPLAY DEVICE

(71) Applicant: Japan Display Inc., Tokyo (JP)

(72) Inventors: Junji Kobashi, Tokyo (JP); Tomoyuki Ishihara, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 18/214,667

(22) Filed: Jun. 27, 2023

(65) Prior Publication Data

US 2024/0005886 A1 Jan. 4, 2024

(30) Foreign Application Priority Data

Jul. 1, 2022 (JP) ................... 2022-107086

(51) Int. Cl.
*G09G 3/36* (2006.01)
*G09G 3/34* (2006.01)
*G02F 1/1335* (2006.01)

(52) U.S. Cl.
CPC ......... *G09G 3/3607* (2013.01); *G09G 3/3426* (2013.01); *G02F 1/133601* (2021.01); *G09G 2320/0233* (2013.01); *G09G 2320/0646* (2013.01); *G09G 2360/16* (2013.01)

(58) Field of Classification Search
CPC ........... G09G 2300/023; G09G 3/3607; G09G 2300/0452; G09G 2320/0276
See application file for complete search history.

(56) References Cited

U.S. PATENT DOCUMENTS

| | | | | |
|---|---|---|---|---|
| 2012/0274669 | A1* | 11/2012 | Neal | G09G 3/342 345/102 |
| 2013/0106923 | A1* | 5/2013 | Shields | G02F 1/1347 345/102 |
| 2020/0111259 | A1* | 4/2020 | Sears | G02B 27/0172 |
| 2021/0142745 | A1 | 5/2021 | Kimura et al. | |
| 2022/0020306 | A1* | 1/2022 | Park | G09G 3/2096 |

FOREIGN PATENT DOCUMENTS

WO 2019/225137 A1 11/2019

* cited by examiner

*Primary Examiner* — Van N Chow
(74) *Attorney, Agent, or Firm* — K&L Gates LLP

(57) ABSTRACT

According to an aspect, a display device includes: a display panel having a display area provided with pixels; a dimming panel disposed so as to face the display panel and having a dimming area provided with dimming pixels; and a light source configured to emit light that travels from the dimming panel toward the display panel. When a pixel among the pixels is controlled to be lit up in white, blurring processing is applied so as to cause more than one of the dimming pixels including a dimming pixel overlapping the pixel to transmit light, and light from the light source is transmitted through the blurring area and the pixel. The blurring area is determined based on a positional misalignment with respect to a predetermined positional relation between the display area and the dimming area.

9 Claims, 29 Drawing Sheets

| BLURRING PROCESSING | FRONT VIEW | OBLIQUE VIEW | SCHEMATIC DIAGRAM |
|---|---|---|---|
| NOT PERFORMED | NORMAL | DOUBLE IMAGE | |
| EMBODIMENT | NORMAL | NORMAL | |

DISPLAY DEVICE

CROSS-REFERENCE TO RELATED APPLICATION

This application claims the benefit of priority from Japanese Patent Application No. 2022-107086 filed on Jul. 1, 2022, the entire contents of which are incorporated herein by reference.

BACKGROUND

1. Technical Field

What is disclosed herein relates to a display device.

2. Description of the Related Art

A configuration is known in which a dimming panel is provided between a liquid crystal display panel and a light source to increase contrast of an image (for example, International Patent Application Publication No. WO/2019/225137).

The light transmittance of the dimming panel is controlled based on the assumption that the positional alignment between the liquid crystal display panel and the dimming panel is accurate. However, errors or other factors in manufacturing may cause a positional misalignment between the liquid crystal display panel and the dimming panel. When the same control as the conventional control is simply applied to the dimming panel in spite of occurrence of such a positional misalignment, a part of display output lacks brightness.

For the foregoing reasons, there is a need for a display device capable of reducing the occurrence of the lack of brightness.

SUMMARY

According to an aspect, a display device includes: a display panel that has a display area in which a plurality of pixels are arranged; a dimming panel that is disposed on one surface side of the display panel so as to face the display panel and has a dimming area in which a plurality of dimming pixels are arranged; and a light source configured to emit light that travels from the dimming panel toward the display panel. When a pixel among the plurality of pixels is controlled to be lit up in white in accordance with a received image signal, blurring processing is applied so as to cause more than one of the plurality of dimming pixels including a dimming pixel overlapping the pixel to transmit light; a blurring area serving as an area including the more than one of the plurality of dimming pixels to which the blurring processing is applied is formed; and light from the light source is transmitted through the blurring area and the pixel to the other surface side of the display panel. The blurring area is determined based on a positional misalignment with respect to a predetermined positional relation between the display area and the dimming area.

DETAILED DESCRIPTION

Figure 1:
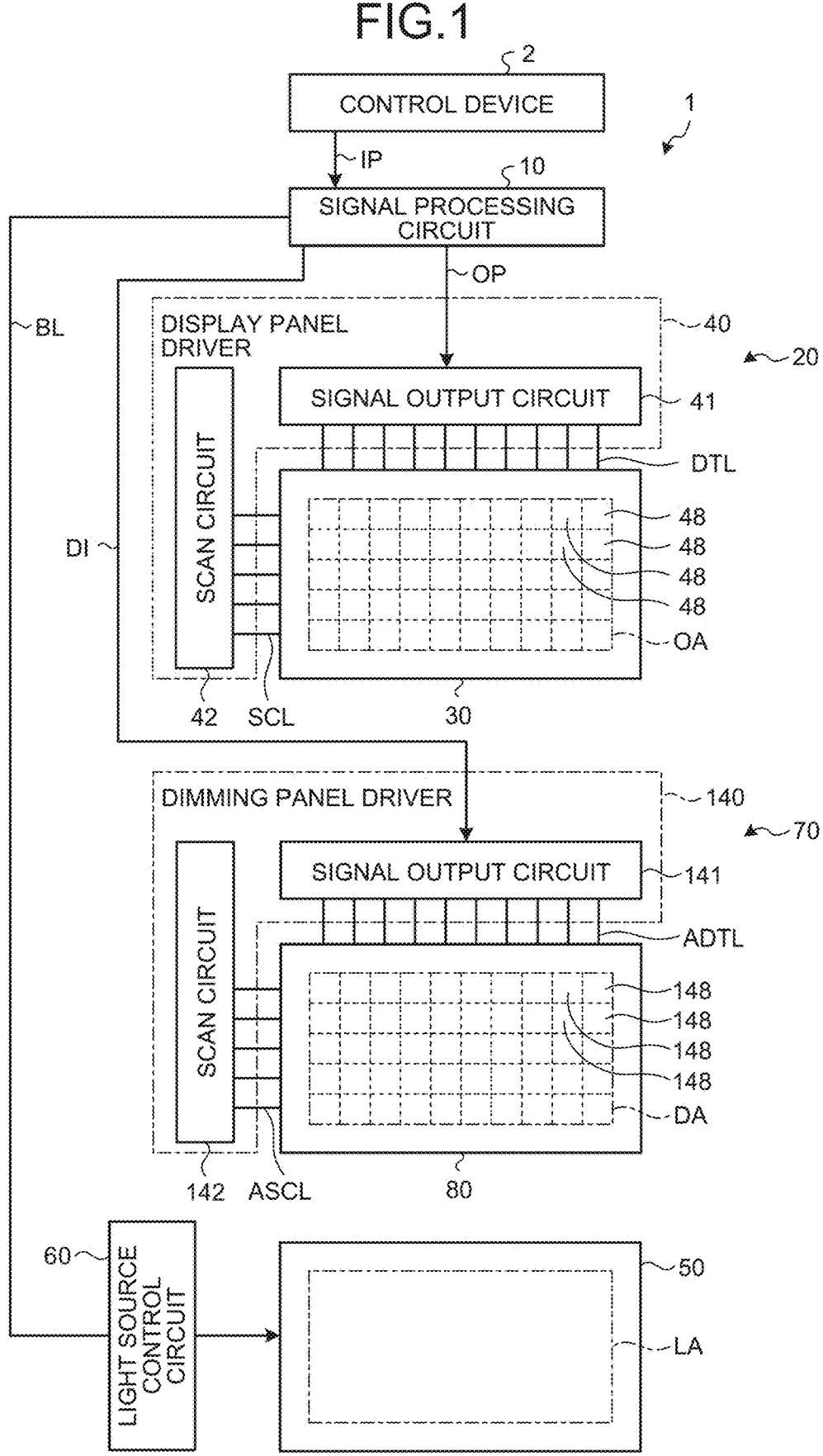
FIG. 1 is a diagram illustrating a main configuration example of a display device according to an embodiment.

The following describes an embodiment of the present disclosure with reference to the drawings. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating a main configuration example of a display device 1 according to the embodiment. The display device 1 of the embodiment includes a signal processing circuit 10, a display part 20, a light source device 50, a light source control circuit 60, and a dimmer (light control part) 70. The signal processing circuit 10 performs various types of output based on an input signal IP received from an external control device 2, and thus controls operations of the display part 20, the light source device 50, and the dimmer 70. The input signal IP is a signal serving as data for outputting an image to be displayed on the display device 1, and is, for example, a red-green-blue (RGB) image signal. The signal processing circuit 10 outputs, to the display part 20, an output image signal OP generated based on the input signal IP. The signal processing circuit 10 also outputs, to the dimmer 70, a dimming signal DI generated based on the input signal IP. After receiving the input signal IP, the signal processing circuit 10 outputs, to the light source control circuit 60, a light source drive signal BL for controlling lighting of the light source device 50. The light source control circuit 60 is, for example, a driver circuit of the light source device 50, and operates the light source device 50 in response to the light source drive signal BL. The light source device 50 includes a light source that emits light from a light-emitting surface LA. In the embodiment, the light source control circuit 60 operates the light source device 50 so as to emit a constant amount of light from the light-emitting surface LA of the light source device 50 in accordance with display timing of a frame image.

The display part 20 includes a display panel 30 and a display panel driver 40. The display panel 30 has a display area OA provided with a plurality of pixels 48. The pixels 48 are arranged, for example, in a matrix having a row-column configuration. The display panel 30 of the embodiment is a liquid crystal image display panel. The display panel driver 40 includes a signal output circuit 41 and a scan circuit 42. The signal output circuit 41 is a circuit serving as what is called a source driver, and drives the pixels 48 in accordance with the output image signal OP. The scan circuit 42 is a circuit serving as what is called a gate driver and outputs a drive signal for scanning the pixels 48 arranged in a matrix having a row-column configuration, in units of a predetermined number of rows (for example, in units of one row). The pixels 48 are driven so as to output gradation values corresponding to the output image signal OP at the time when the drive signal is output. The display panel driver 40 may be included in the configuration of the display panel 30.

The dimmer 70 adjusts the amount of light that is emitted from the light source device 50 and is output through the display area OA. The dimmer 70 includes a dimming panel 80 and a dimming panel driver 140. The dimming panel 80 has a dimming area DA provided so as to be capable of varying transmittance of light. The dimming area DA is disposed in a position overlapping the display area OA when the display area OA is viewed in plan view. The dimming area DA covers the entire display area OA in plan view. The light-emitting surface LA covers the entire display area OA and the entire dimming area DA in plan view. The dimming panel driver 140 may be included in the configuration of the dimming panel 80.

Figure 2:
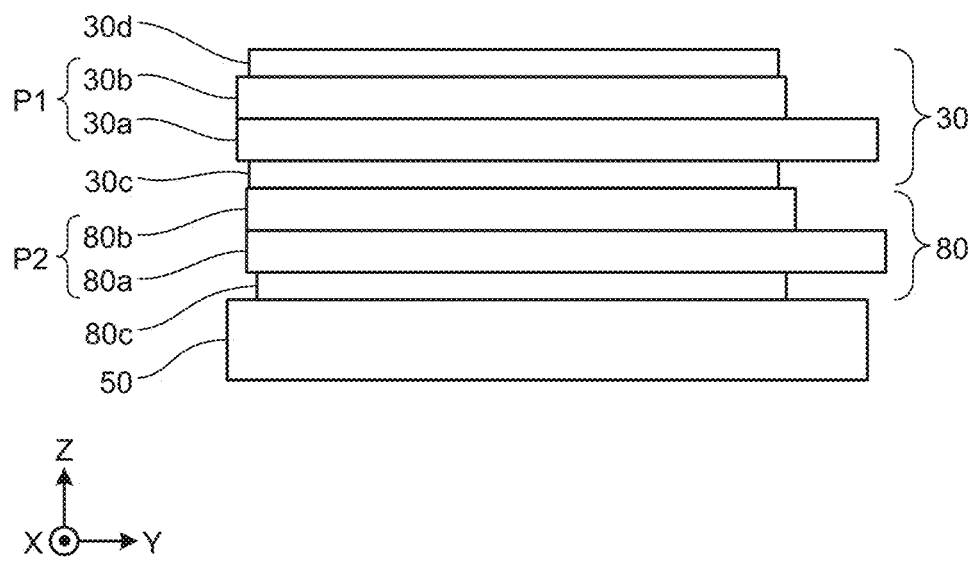
FIG. 2 is a diagram illustrating an exemplary positional relation between a display panel, a dimming panel, and a light source device.

FIG. 2 is a diagram illustrating an exemplary positional relation between the display panel 30, the dimming panel 80, and the light source device 50. In the embodiment, the display panel 30, the dimming panel 80, and the light source device 50 are stacked as illustrated in FIG. 2. Specifically, the dimming panel 80 is stacked on a light-emitting surface side of the light source device 50 from which the light is emitted. The display panel 30 is stacked on a side opposite to the light source device 50 with the dimming panel 80 interposed therebetween. The light emitted from the light source device 50, the amount of which is adjusted by the dimming area DA of the dimming panel 80, illuminates the display panel 30. The display panel 30 is illuminated from a back surface side thereof where the light source device 50 is located, and outputs the image for display to a side (display surface side) opposite to the back surface side. In this manner, the light source device 50 serves as backlight that illuminates the display area OA of the display panel 30 from the back surface thereof. In the embodiment, the dimming panel 80 is provided between the display panel 30 and the light source device 50. Hereinafter, a Z-direction refers to a direction in which the display panel 30, the dimming panel 80, and the light source device 50 are stacked. An X-direction and a Y-direction refer to two directions orthogonal to the Z-direction. The X-direction is orthogonal to the Y-direction. The pixels 48 are arranged in a matrix having a row-column configuration along the X-direction and the Y-direction.

The display panel 30 includes an array substrate 30a and a counter substrate 30b that is located on the display surface side of the array substrate 30a and faces the array substrate 30a. As will be described later, a liquid crystal layer LC1 is disposed between the array substrate 30a and the counter substrate 30b (refer to FIG. 5). A polarizing plate 30c is provided on the back surface side of the array substrate 30a. A polarizing plate 30d is provided on a display surface side of the counter substrate 30b. The dimming panel 80 includes a first substrate 80a and a second substrate 80b that is located on the display surface side of the first substrate 80a and faces the first substrate 80a. As will be described later, a liquid crystal layer that is the same as the liquid crystal layer LC1 is disposed between the first substrate 80a and the second substrate 80b. A polarizing plate 80c is provided on the back surface side of the first substrate 80a. The polarizing plate 30c polarizes light both on the back surface side of the display panel 30 and on the display surface side of the dimming panel 80.

Hereinafter, a first panel P1 denotes a component that includes the array substrate 30a, the counter substrate 30b, and the liquid crystal layer LC1 interposed between the array substrate 30a and the counter substrate 30b. The first panel P1 naturally also includes non-illustrated components stacked with the array substrate 30a and the counter substrate 30b. A second panel P2 denotes a component that includes the first and the second substrates 80a and 80b and the liquid crystal layer LC1 interposed between the first and the second substrates 80a and 80b. The second panel P2 naturally also includes non-illustrated components stacked with the first and the second substrates 80a and 80b.

Figure 3:
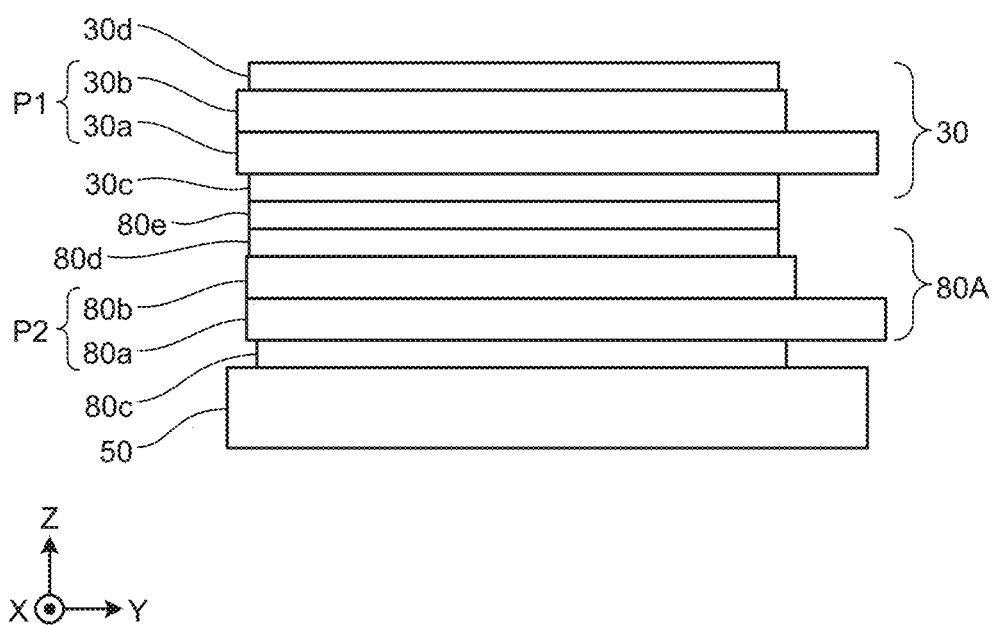
FIG. 3 is a diagram illustrating an example in which a polarizing plate is provided on a display surface side of the dimming panel.

FIG. 3 is a diagram illustrating an example in which a polarizing plate 80d is provided on the display surface side of a dimming panel 80A. As illustrated in FIG. 3, the polarizing plate 80d may be provided on the display surface side of the second substrate 80b. As illustrated in FIG. 3, a diffusion layer 80e for diffusing light may be interposed between the polarizing plate 30c and the polarizing plate 80d.

Figure 4:
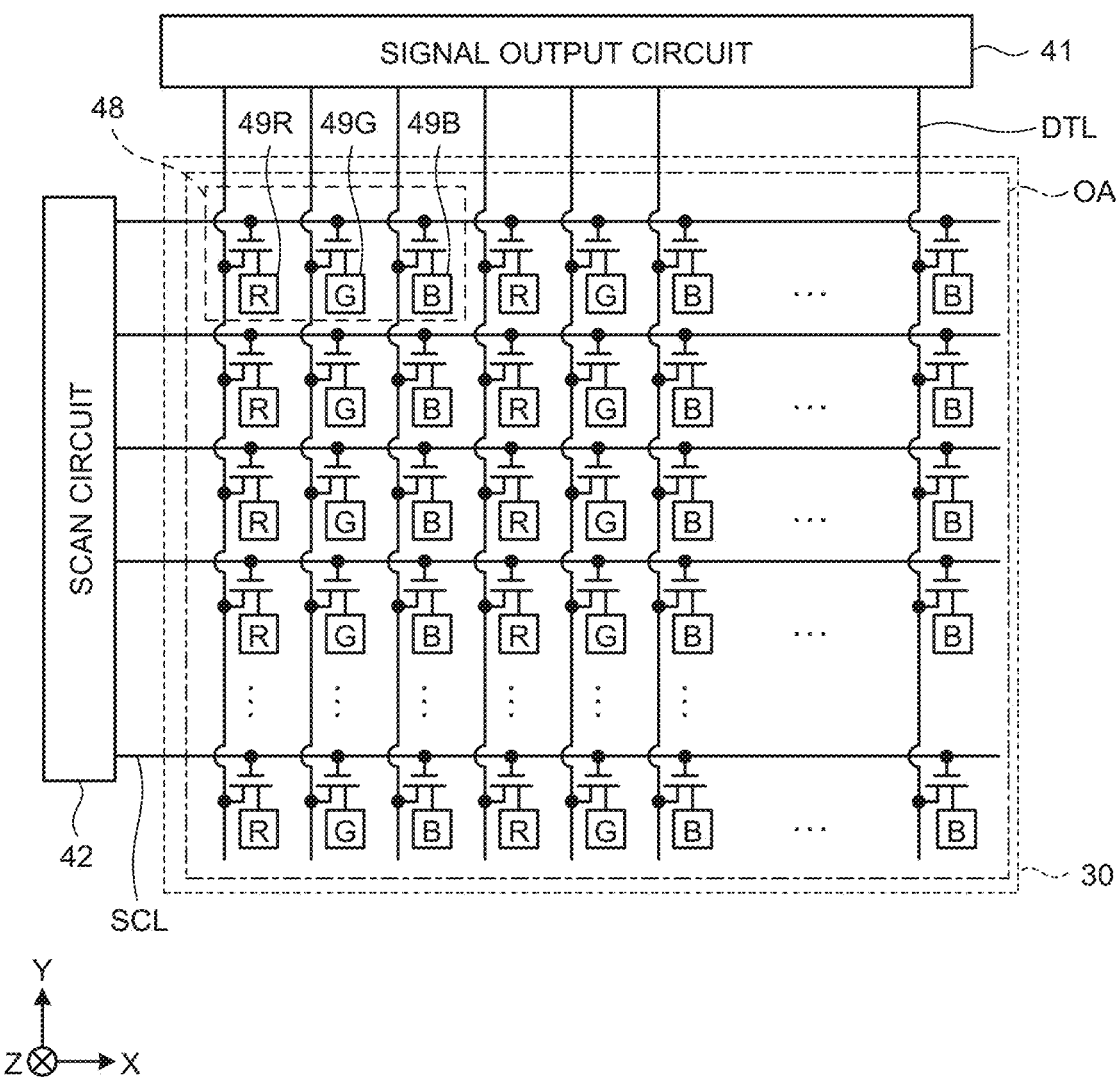
FIG. 4 is a diagram illustrating an exemplary pixel array of the display panel.

FIG. 4 is a diagram illustrating an exemplary pixel array of the display panel 30. As illustrated in FIG. 4, each of the pixels 48 includes, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, each of the pixels 48 arranged in a matrix having a row-column configuration on the display panel 30 includes the first sub-pixel 49R for displaying a first color, the second sub-pixel 49G for displaying a second color, and the third sub-pixel 49B for displaying a third color. The first color, the second color, and the third color are not limited to the first primary color, the second primary color, and the third primary color, and only need to be different colors from one another, such as complementary colors. In the following description, the first sub-pixel 49R, the second sub-pixel 49G, and the third sub-pixel 49B will be each called a sub-pixel 49 when they need not be distinguished from one another.

The pixel 48 may further include another sub-pixel 49 in addition to the first sub-pixel 49R, the second sub-pixel 49G, and the third sub-pixel 49B. For example, the pixel 48 may include a fourth sub-pixel for displaying a fourth color. The fourth sub-pixel displays a fourth color (for example, white). The fourth sub-pixel is preferably brighter than the first sub-pixel 49R for displaying the first color, the second sub-pixel 49G for displaying the second color, and the third sub-pixel 49B for displaying the third color, when they are irradiated with the same light source lighting amount.

The display device 1 is more specifically a transmissive color liquid crystal display device. As illustrated in FIG. 4, the display panel 30 is a color liquid crystal display panel, in which a first color filter for transmitting light in the first primary color is disposed between the first sub-pixel 49R and an image viewer, a second color filter for transmitting light in the second primary color is disposed between the second sub-pixel 49G and the image viewer, and a third color filter for transmitting light in the third primary color is disposed between the third sub-pixel 49B and the image viewer. The first color filter, the second color filter, and the third color filter are components included in a filter film 26 to be described later.

When the fourth sub-pixel is provided, no color filter is disposed between the fourth sub-pixel and the image viewer. In this case, a large level difference in height is generated at the fourth sub-pixel. Therefore, a transparent resin layer instead of the color filter may be provided on the fourth sub-pixel. This configuration can reduce the generation of the large level difference in height at the fourth sub-pixel.

The signal output circuit 41 is electrically coupled to the display panel 30 through signal lines DTL. The display panel driver 40 uses the scan circuit 42 to select the sub-pixel 49 on the display panel 30 and to control ON and OFF of a switching element (such as a thin-film transistor (TFT)) for controlling operation (light transmittance) of the sub-pixel 49. The scan circuit 42 is electrically coupled to the display panel 30 through scan lines SCL.

In the embodiment, the signal lines DTL are arranged in the X-direction. Each of the signal lines DTL extends in the Y-direction. The scan lines SCL are arranged in the Y-direction. Each of the scan lines SCL extends in the X-direction. Thus, in the embodiment, in response to the drive signal output from the scan circuit 42, the pixels 48 are driven for each pixel row (line) including a plurality of the pixels 48 arranged in the X-direction so as to share the scan line SCL. Hereinafter, a simple notation of "line" refers to a pixel row including the pixels 48 arranged in the X-direction so as to share the scan line SCL.

The term "horizontal scan direction" refers to a direction along the extending direction of each of the scan lines SCL. The term "vertical scan direction" refers to the arrangement direction of the scan lines SCL. In the embodiment, the X-direction corresponds to the horizontal scan direction, and the Y-direction corresponds to the vertical scan direction.

Figures 5, 6:
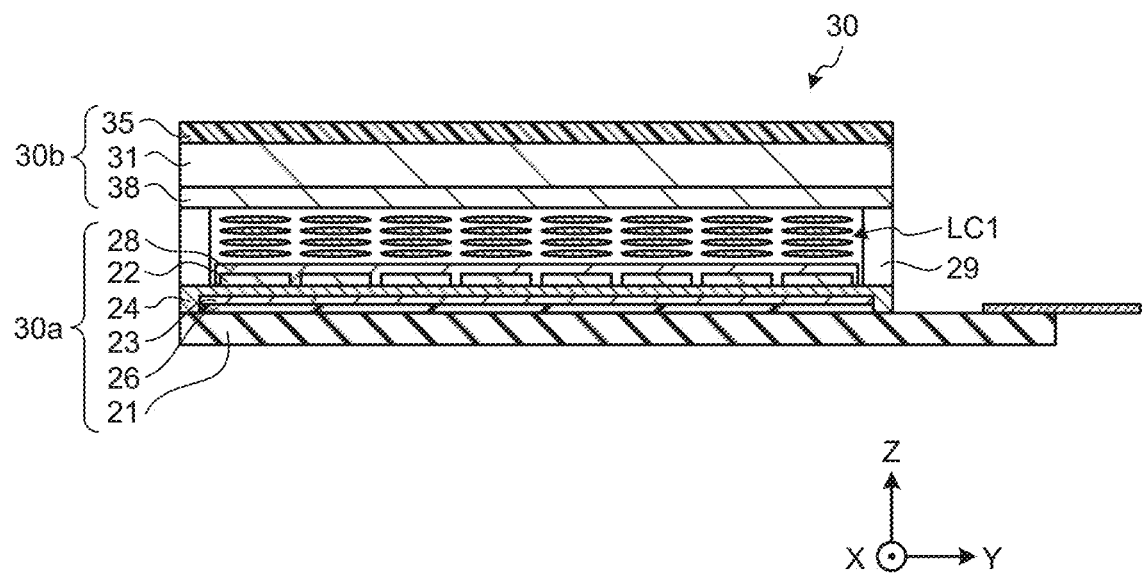
FIG. 5 is a sectional view illustrating an exemplary schematic sectional structure of the display panel.
FIG. 6 is a diagram illustrating relations between types of blurring processing, states of an image viewed in a front view and an oblique view, and schematic diagrams illustrating outlines of the blurring processing.

FIG. 5 is a sectional view illustrating an exemplary schematic sectional structure of the display panel 30. The array substrate 30a includes the filter film 26 provided on the upper side of a pixel substrate 21 such as a glass substrate, a counter electrode 23 provided on the upper side of the filter film 26, an insulating film 24 provided on the upper side of the counter electrode 23 so as to be in contact therewith, pixel electrodes 22 on the upper side of the insulating film 24, and a first orientation film 28 provided on the uppermost surface side of the array substrate 30a. The counter substrate 30b includes a counter pixel substrate 31 such as a glass substrate, a second orientation film 38 provided on the lower surface of the counter pixel substrate 31, and a polarizing plate 35 provided on the upper surface of the counter pixel substrate 31. The array substrate 30a is fixed to the counter substrate 30b with a sealing part 29 interposed therebetween. The liquid crystal layer LC1 is sealed in a space surrounded by the array substrate 30a, the counter substrate 30b, and the sealing part 29. The liquid crystal layer LC1 contains liquid crystal molecules that change in orientation direction depending on an electric field applied thereto. The liquid crystal layer LC1 modulates light passing through the inside of the liquid crystal layer LC1 depending on the state of the electric field. The electric field applied between the pixel electrodes 22 and the counter electrode 23 changes the orientations of the liquid crystal molecules of the liquid crystal layer LC1, and thus changes the transmission amount of the light passing through the liquid crystal layer LC1. The sub-pixels 49 include the respective pixel electrodes 22. The switching elements for individually controlling the operation (light transmittance) of the sub-pixels 49 are electrically coupled to the pixel electrodes 22.

The dimmer 70 includes the dimming panel 80 and the dimming panel driver 140. The dimming panel 80 of the embodiment has the same configuration as that of the display panel 30 illustrated in FIG. 5 except that the filter film 26 is not included. Thus, the dimming panel 80 includes dimming pixels 148 including sub-pixels 49 not provided with the color filters (refer to FIG. 1) instead of the pixels 48 including the first sub-pixels 49R, the second sub-pixels 49G, and the third sub-pixels 49B distinguished by the colors of the color filters (refer to FIG. 4). That is, the dimming panel 80 is a monochrome liquid crystal panel.

Each of the dimming pixels 148 may include one monochrome sub-pixel corresponding to the size and shape of the pixel 48 in plan view or may include a plurality of sub-pixels corresponding to the size, shape, and number of the sub-pixels 49 included in the pixel 48. Even when a plurality of sub-pixels are included, the monochrome sub-pixels included in each of the dimming pixels 148 are controlled to have the same degree of transmission of light. The degree of transmission of light is a degree of transmission of light determined by blurring processing to be described later.

A signal output circuit 141 and a scan circuit 142 included in the dimming panel driver 140 have the same configurations as those of the signal output circuit and the scan circuit of the display panel driver 40 except that the signal output circuit 141 and the scan circuit 142 are coupled to the dimming panel 80. Signal lines ADTL between the dimming panel 80 and the dimming panel driver 140 illustrated in FIG. 1 have the same configuration as those of the signal lines DTL described with reference to FIG. 4. Scan lines ASCL between the dimming panel 80 and the dimming panel driver 140 illustrated in FIG. 1 have the same configuration as those of the scan lines SCL described with reference to FIG. 4.

In the embodiment, the arrangement of the pixels 48 in the display area OA is the same as the arrangement of the dimming pixels 148 in the dimming area DA. Therefore, in the embodiment, the number of the pixels 48 arranged in the X-direction of the display area OA is the same as the number of the dimming pixels 148 arranged in the X-direction of the dimming area DA. In the embodiment, the number of the pixels 48 arranged in the Y-direction of the display area OA is the same as the number of the dimming pixels 148 arranged in the Y-direction of the dimming area DA. In the embodiment, the display area OA overlaps the dimming area DA in XY-plane view. The Z-direction corresponds to an optical axis LL (refer to FIG. 6) of the light emitted from the light-emitting surface LA of the light source device 50. Thus, an optical axis (optical axis LL) of light passing through one of the pixels 48 with one of the dimming pixels 148 that is located in a position overlapping the pixel 48 in XY-plane view. However, the light emitted from the light-emitting surface LA is radially diffused incoherent light. Therefore, light rays in directions not along the optical axis LL may also enter the dimming pixels 148 and the pixels 48.

FIG. 6 is a diagram illustrating relations between types of the blurring processing, states of an image viewed in a front view FV and an oblique view DV, and schematic diagrams illustrating outlines of the blurring processing. In each of the schematic diagrams in FIG. 6, the front view FV and the oblique view DV are indicated by a position of an eye and an angle of a line of sight toward the display panel 30.

First, the following describes a case where the blurring processing is not performed, that is, the "blurring processing" in FIG. 6 is "not performed". The case where the blurring processing is not performed refers to a case where the dimming gradation value applied to the dimming pixel 148 corresponds only to the input value for the pixel 48 transmitting light having the optical axis LL that coincides with an optical axis of the light passing through the dimming pixel 148. In this case, the image is normally recognized in the front view FV. However, in the oblique view DV, parallax occurs between an image viewed by the right eye and an image viewed by the left eye due to mismatch between the line of sight and the optical axis LL, which is a common optical axis for both the pixel 48 and the dimming pixel 148. This parallax causes a user viewing the display panel 30 at an angle of the oblique view DV to recognize the image as a double image.

Therefore, in the embodiment, the degree of transmission of light through each of the dimming pixels 148 is controlled taking into account the gradation value of each of the pixels 48 and viewing angle characteristics of the display panel 30. This control allows the normal image to be viewed both in the front view FV and the oblique view DV as in the case where the "blurring processing" is the "embodiment" in FIG. 6. FIG. 6 schematically illustrates that a blurring area BLU according to the embodiment allows the normal image to be viewed both in the front view FV and the oblique view DV.

The blurring area BLU is an area in which the dimming pixels 148 that are increased in the dimming gradation value (degree of transmission of light) by a positive amount by the blurring processing are arranged. The expression "increased in the dimming gradation value (degree of transmission of light) by a positive amount by the blurring processing" means that, when comparing the degree of transmission of light through the dimming pixels 148 under the condition where the blurring processing is not applied to the display device 1 with the degree of transmission of light through the dimming pixels 148 under the condition where the blurring processing is applied to the display device 1, the latter degree of transmission of light is higher. The blurring processing is blurring processing corresponding to the pixel 48 controlled to transmit light based on the input signal IP. The blurring area BLU includes the dimming pixels 148 arranged around the pixel 48 in plan view in order to control the operation of the dimming pixels 148 so as to transmit light reaching the pixel 48. Therefore, even if the blurring processing is performed on the dimming pixels 148 located outside the blurring area BLU, the dimming gradation value (degree of transmission of light) is naturally not increased by a positive amount (increased by zero amount) by the blurring processing. That is, the boundary line for distinguishing between the inside and the outside of the blurring area BLU is determined by whether the dimming gradation value (degree of transmission of light) is increased by a positive amount. The positive amount is added to the dimming gradation value (degree of transmission of light) by the blurring processing. The blurring processing is performed corresponding to the pixel 48 controlled so as to transmit light based on the input signal IP.

The term "viewing angle" refers to an angular range in which the user viewing an image of the display device 1 can sufficiently recognize a luminance difference of the pixels 48 as a difference in contrast. A reference angle (zero degrees) in the viewing angle refers to a case where the user views the display area OA from a position in the Z-direction (right in front) of the display area OA. The "viewing angle characteristics" are determined depending on, for example, a driving method of liquid crystals employed for the display panel 30. The viewing angle characteristics include not only the degree of the viewing angle but also characteristics regarding the contrast of the display output. More specifically, the viewing angle characteristics are characteristics related to the difference in contrast between a case where the display device 1 is viewed from the Z-direction and a case where the display device 1 is viewed from a direction deviating from the Z-direction.

As illustrated in FIG. 2, the display panel 30 and the dimming panel 80 are bonded together so as to overlap each other when viewed in the Z-direction. In this case, the display panel 30 and the dimming panel 80 may be positionally misaligned from each other in plan view. The positional misalignment between the display panel 30 and the dimming panel 80 will be described below with reference to FIG. 7.

Figure 7:
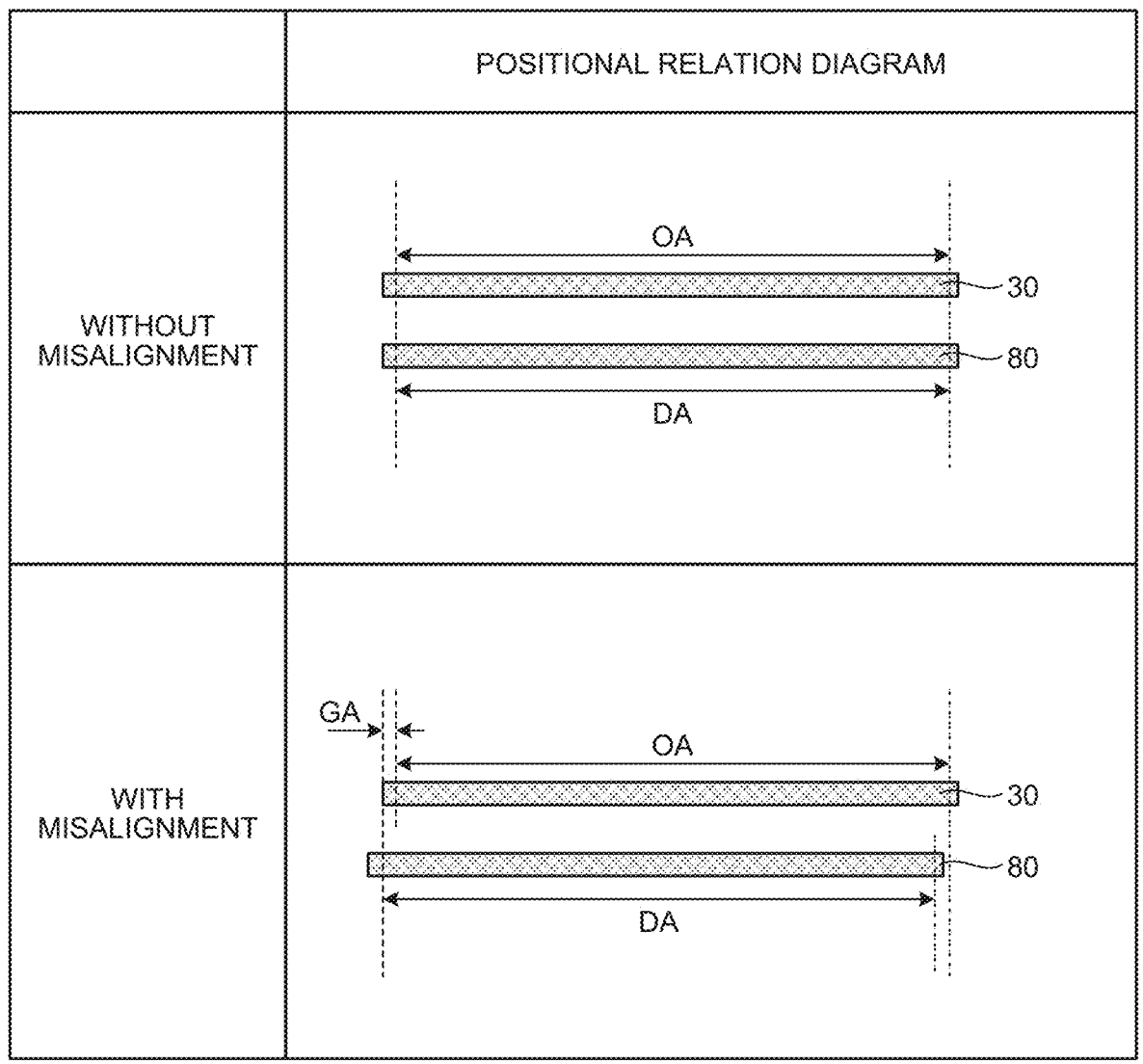
FIG. 7 is a diagram illustrating a difference between a case where no positional misalignment is present between the display panel and the dimming panel and a case where a positional misalignment is present between the display panel and the dimming panel.
Figure 21:
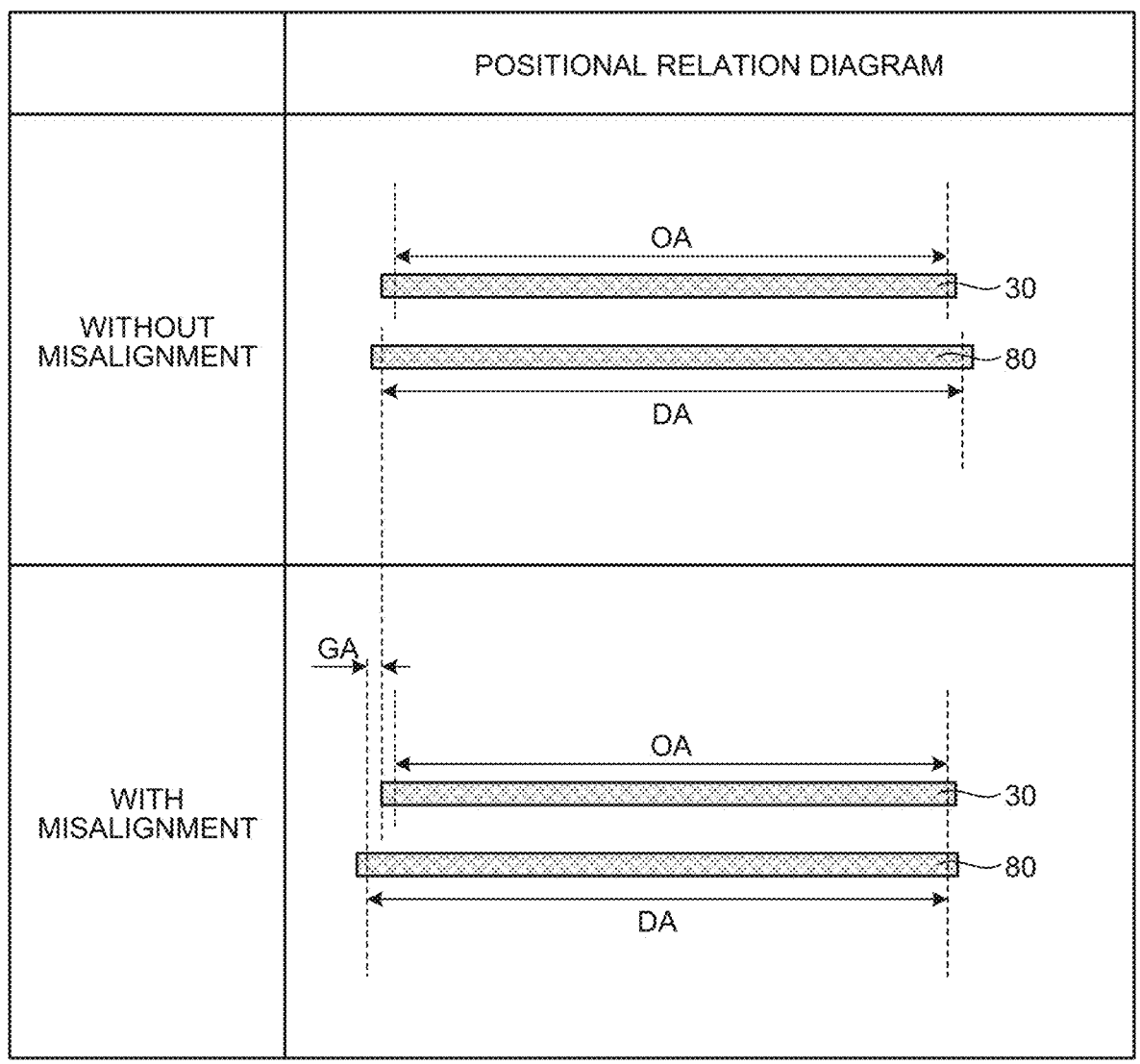
FIG. 21 is a diagram illustrating an example in which a width of a dimming area in a direction orthogonal to a Z-direction is set to be larger than that of a display area.

FIG. 7 is a diagram illustrating a difference between a case where no positional misalignment is present between the display panel 30 and the dimming panel 80 and a case where a positional misalignment is present between the display panel 30 and the dimming panel 80. FIG. 7 and FIG. 21 (which is to be explained later) are each intended to illustrate a case where a positional relation between the display area OA and the dimming area DA is viewed from a lateral side with respect to the stacking direction (Z-direction) of the display panel 30 and the dimming panel 80. The display panel 30 and the dimming panel 80 may be closely attached or bonded to each other so as not to have a gap between the display panel 30 and the dimming panel 80.

The position of the display area OA ideally corresponds to the position of the dimming area DA, as illustrated in the row titled "without misalignment" in FIG. 7. In practice, however, due to manufacturing errors or the like, the position of the display area OA and the position of the dimming area DA may deviate from the ideal positional relation, as illustrated in the row titled "with misalignment". In the case of "with misalignment", the misalignment between the position of the display area OA and the position of the dimming area DA is indicated as a positional misalignment GA.

Figure 8:
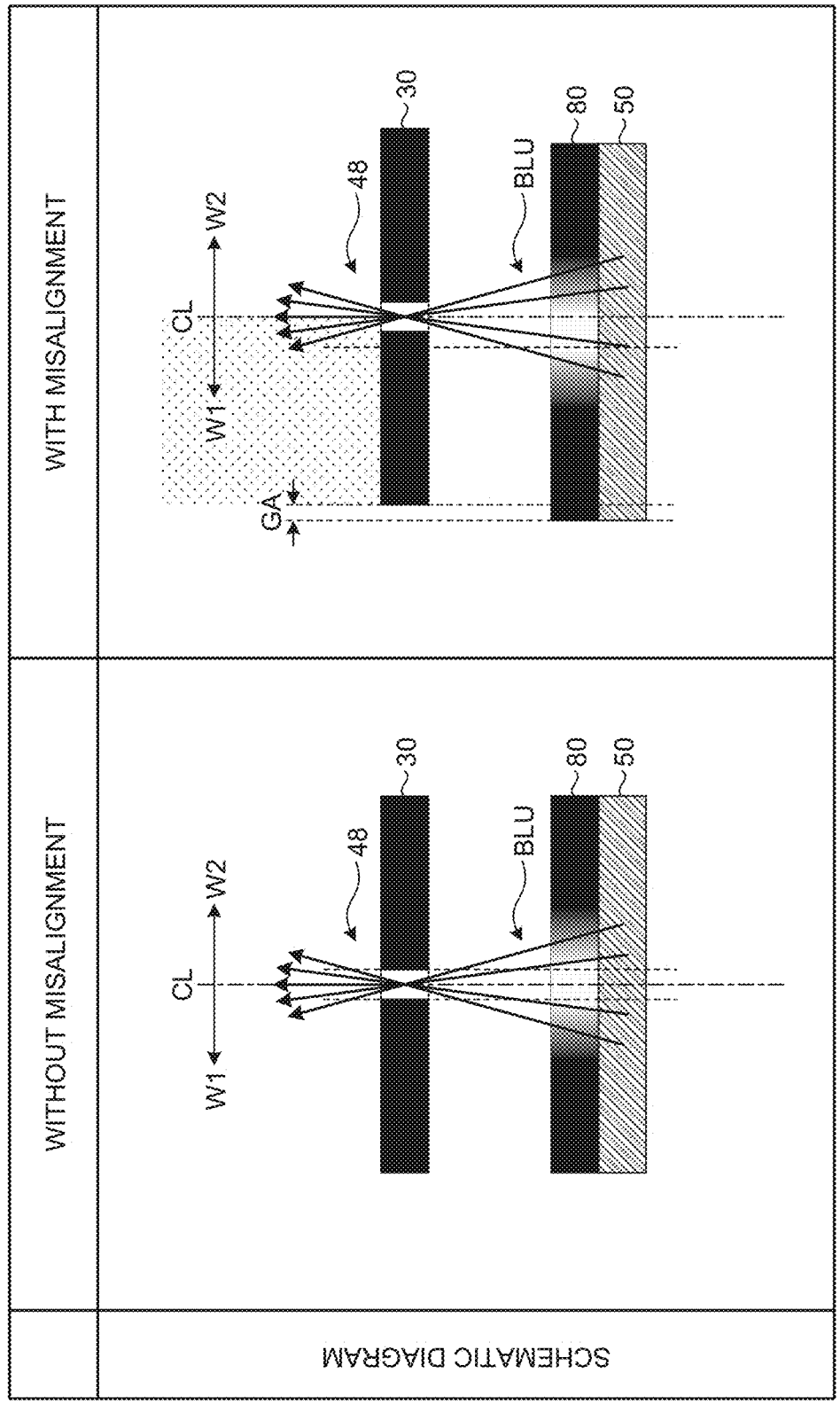
FIG. 8 is a diagram illustrating an effect of the positional misalignment explained with reference to FIG. 7 on a positional relation between a pixel and a blurring area.

FIG. 8 is a diagram illustrating an effect of the positional misalignment GA explained with reference to FIG. 7 on a positional relation between the pixel 48 and the blurring area BLU. As illustrated in the column titled "without misalignment" in FIG. 8, the signal processing circuit 10 controls the dimming pixels 148 so as to generate the blurring area BLU corresponding to the pixel 48 controlled to transmit light on the assumption that the positional misalignment GA is not present. Specifically, the signal processing circuit 10 generates the blurring area BLU where the degree of light transmitted through the dimming panel 80 is symmetrical between one W1 side and another W2 side opposite to each other in a direction orthogonal to the Z-direction with a center line CL of the pixel 48 controlled to transmit light interposed between the one W1 side and the other W2 side. The center line CL is a line passing through the pixel 48 along the Z-direction and is the center line of the pixel 48 when the pixel 48 is viewed from the lateral side with respect to the Z-direction. In the blurring area BLU, in principle, the degree of transmission of light is higher as the dimming pixel 148 is located closer to the center line CL. In contrast, if the blurring area BLU is controlled without taking into account the positional misalignment GA while the positional misalignment GA occurs, the degree of transmission of light by the blurring area BLU is unbalanced between the one W1 side and the other W2 side, as illustrated in the column titled "with misalignment" in FIG. 8. As a result, one of the one W1 side and the other W2 side looks relatively brighter, and the other of the one W1 side and the other W2 side looks relatively darker. In the case of "with misalignment" in FIG. 8, an example is illustrated where the one W1 side of the pixel 48 looks darker than the other W2 side thereof does because the other W2 side of the blurring area BLU is darker than the one W1 side thereof is. Thus, if no particular measures are taken, the positional misalignment GA causes a lack of brightness on the one W1 side or the other W2 side.

Therefore, the signal processing circuit 10 of the embodiment applies a process to reduce the occurrence of the lack of brightness on the one W1 side or the other W2 side that would be caused by the positional misalignment GA. As such a process, any of a first, a second, and a third processes to be described below is applied to the embodiment. The following sequentially describes the processes.

First Process

Figure 9:
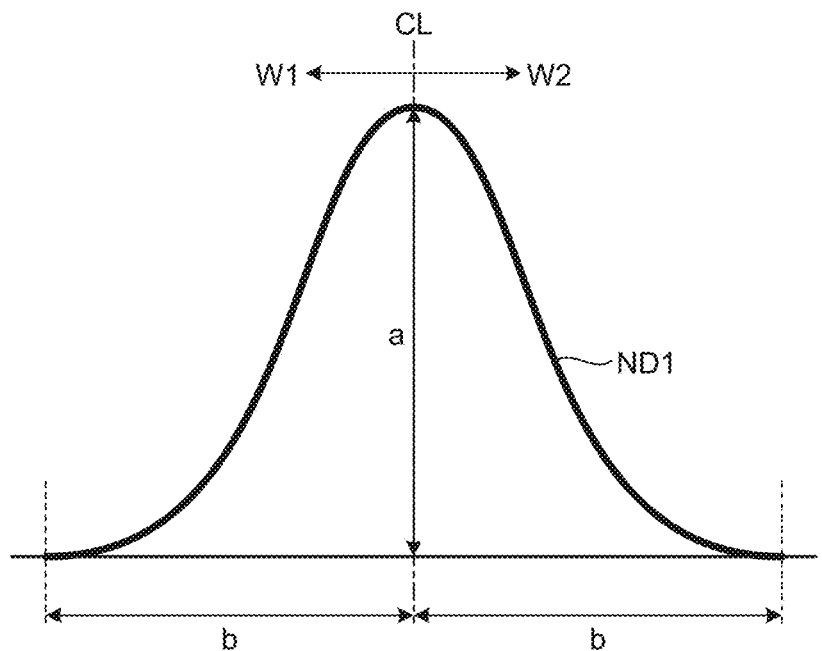
FIG. 9 is a diagram for explaining matters related to a first process.
Figure 10:
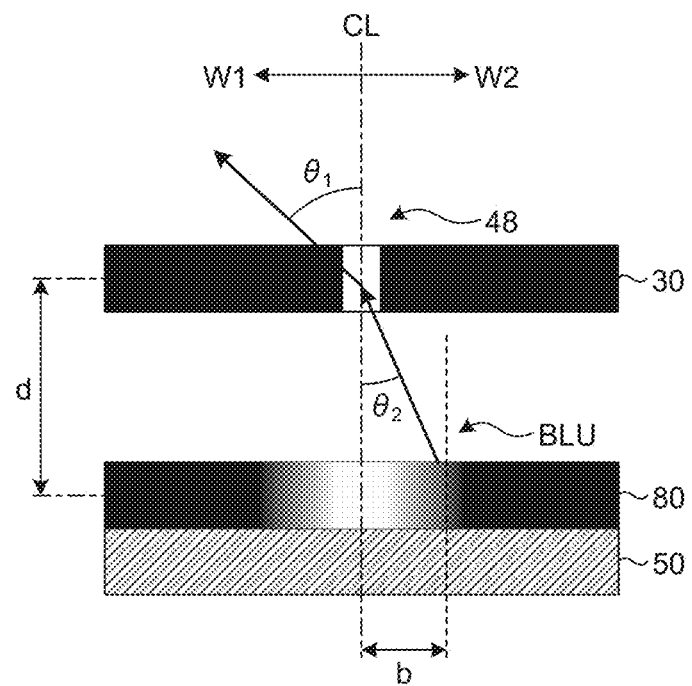
FIG. 10 is a diagram for explaining the matters related to the first process.

FIGS. 9 and 10 are diagrams for explaining matters related to the first process. FIG. 9 schematically illustrates a distribution of the degree of transmission of light in the blurring area BLU as a curve ND1 that is a Gaussian function curve having the highest point on the center line CL. The curve ND1 can be expressed as Expression (1) below. The symbol a in Expression (1) and FIG. 9 denotes a value indicating the degree of transmission of light at a place where the degree of transmission of light is highest in the blurring area BLU, and corresponds to the amplitude of the Gaussian function curve. The vertical axis direction of the curve ND1 and curves ND2 and ND3 to be described later represents the luminance of the blurring area BLU, and a highest point (a) represents the highest luminance.

The symbol x in Expression (1) denotes the center position of the blurring area BLU. x is the coordinate of the dimming pixel 148 with respect to the preset origin of the dimming panel 80 in planar view, and corresponds to the display panel 30 controlled to transmit light. The symbol exp in Expression (1) and other expressions represents a function to calculate a power of the base (e) of the natural logarithm. The value of e is approximately 2.71828182845904. As illustrated in FIG. 9, the symbol b in Expression (1) corresponds to the spread of the Gaussian function curve with a as the highest point at the center.

$$f(x)=a\times\exp(-4x^2/b^2) \quad (1)$$

FIG. 10 illustrates the blurring area BLU centered on the center line CL in the ideal positional relation between the display panel 30 and the dimming panel 80 without the positional misalignment GA. As indicated by the correspondence relation between FIGS. 9 and 10, the value of b corresponds to the spread of the blurring area BLU, with the center line CL serving as the center and corresponding to the highest degree of transmission of light (a). As illustrated in FIG. 10, an angle 81 and an angle $\theta_2$ are different from each other. The angle 81 is the angle of the light that passes through the dimming panel 80 and the display panel 30 and travels toward the user who views the image on the display device 1. The angle $\theta_2$ is the angle of light traveling from the dimming panel 80 toward the display panel 30. The difference between the angle $\theta_1$ and the angle $\theta_2$ is caused by a difference (n) in between the refractive index of the material (such as glass) of the panels forming the display panel 30 and the dimming panel 80 and the refractive index of a component (such as air) around the display device 1. The value of b in Expression (1) is set taking into account the above-mentioned difference in refractive index and a center-to-center distance (d) between the pixel 48 and the dimming pixel 148 in the Z-direction. Specifically, b can be derived from Expression (4) based on Expressions (2) and (3) below. The symbol tan in Expression (2) and other expressions denotes a tangent function as a trigonometric function. The symbol sin in Expression (3) and other expressions denotes a sine function as a trigonometric function. The symbol arcsin in Expression (4) denotes an inverse function of a sine function as a trigonometric function. The value of d in Expression (1) and other expressions, that is, the center-to-center distance between the pixel 48 and the dimming pixel 148 in the Z-direction represents the distance between the center position of the display panel 30 in the Z-direction and the center position of the dimming panel 80 in the −Z direction. For example, assuming that the display panel 30 and the dimming panel 80 are in close contact with a gap of 0, d is the sum of half the thickness of the display panel 30 and half the thickness of the dimming panel 80.

$$b=d\times\tan\theta_2 \quad (2)$$

$$\sin\theta_1=n\times\sin\theta_2 \quad (3)$$

$$b=d\times\tan(\arcsin(\sin\theta_1/n)) \quad (4)$$

The value of b in FIG. 10 and Expression (4) is obtained on the assumption that the positional misalignment GA is not present. The position of the highest degree of transmission of light (a) coincides with the center line CL in the blurring area BLU, and a sufficient light intensity is obtained on both the one W1 side and the other W2 side. In contrast, if the positional misalignment GA is present, the light intensity is insufficient on the one W1 side or the other W2 side unless countermeasures are taken. Therefore, in the first process, processing is performed to expand the entire blurring area BLU by increasing the value of b, that is, expanding the spread centered on the highest point (a) in the Gaussian function curve illustrated in FIG. 9.

To what extent the value of b is to be increased corresponds to the amount of the positional misalignment GA. The change in degree of transmission of light with a spread (b) centered on the highest point (a) in the Gaussian function curve illustrated in FIG. 9 is continuous and not stepwise, but the change in degree of transmission of light actually applied to the dimming pixels 148 is discrete and the difference in degree of transmission of light between the adjacent dimming pixels 148 is stepwise. The details of the degree to which b is increased and the difference in the degree of transmission of light between the adjacent dimming pixels 148 will be described later with reference to FIG. 22 and later drawings.

Second Process

Figure 11:
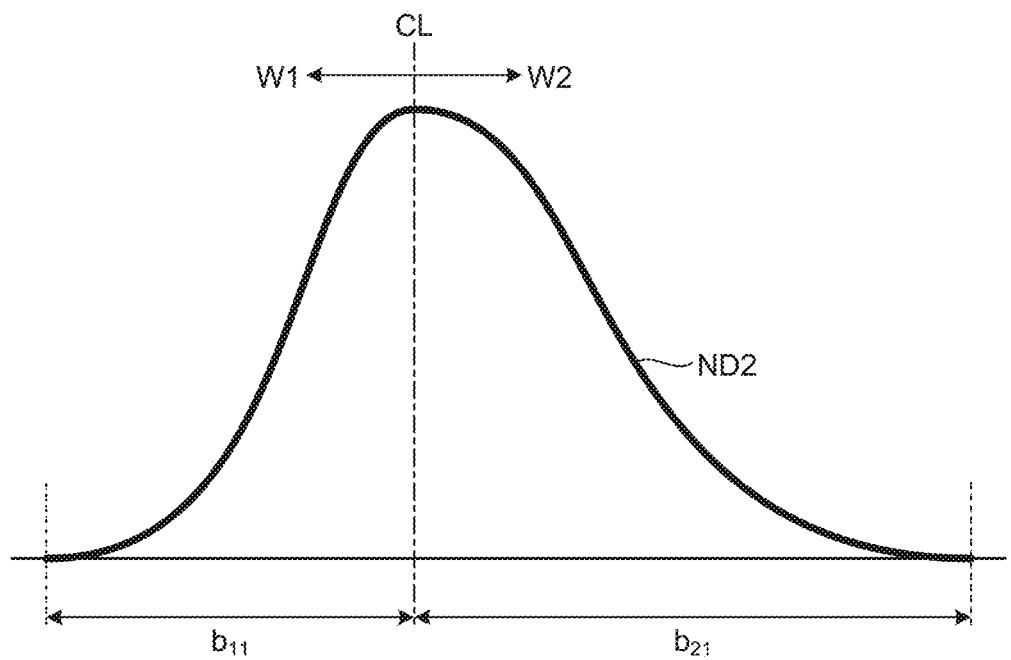
FIG. 11 is a diagram for explaining matters related to a second process.

FIG. 11 is a diagram for explaining matters related to the second process. When the positional misalignment GA is not present and in the first process, the spread (b) in the Gaussian function curve (refer to FIG. 9) indicating the degree of transmission of light by the blurring area BLU is symmetrical between the one W1 side and the other W2 side with respect to the highest point (a) as the center. In contrast, in the second process, processing is performed to differentiate the spreads ($b_{11}, b_{21}$) in the Gaussian function curve (refer to FIG. 9) indicating the degree of transmission of light by the blurring area BLU between the one W1 side and the other W2 side.

A side of the curve ND2 having a relatively smaller spread than a side located with the center line CL illustrated in FIG. 11 interposed therebetween can be expressed as Expression (5) below. The side of the curve ND2 having a relatively larger spread than the side located with the center line CL illustrated in FIG. 11 interposed therebetween can be expressed as Expression (6) below. b. in Expression (5) is $b_{11}$, for example. b, in Expression (6) is $b_{21}$, for example.

$$f(x)=a\times\exp(-4x^2/b_-^2) \qquad (5)$$

$$f(x)=a\times\exp(-4x^2/b_+^2) \qquad (6)$$

In the description with reference to the column titled "with misalignment" in FIG. 8, the positional misalignment GA causes the insufficient intensity of the light passing through the other W2 side of the blurring area BLU. In the example illustrated in FIG. 11, the spread ($b_{21}$) on the other W2 side is set to be larger than the spread ($b_{11}$) on the one W1 side in order to reduce the insufficiency in intensity of the light passing through the other W2 side. The degree to which the second process expands one side of the spread (b) of the Gaussian function curve (to $b_{21}$, for example) in the curve ND2 according to the direction in which the positional misalignment GA has occurred, depends on the amount of the positional misalignment GA, the details of which will be described later with reference to FIG. 22 and later drawings.

Third Process

Figure 12:
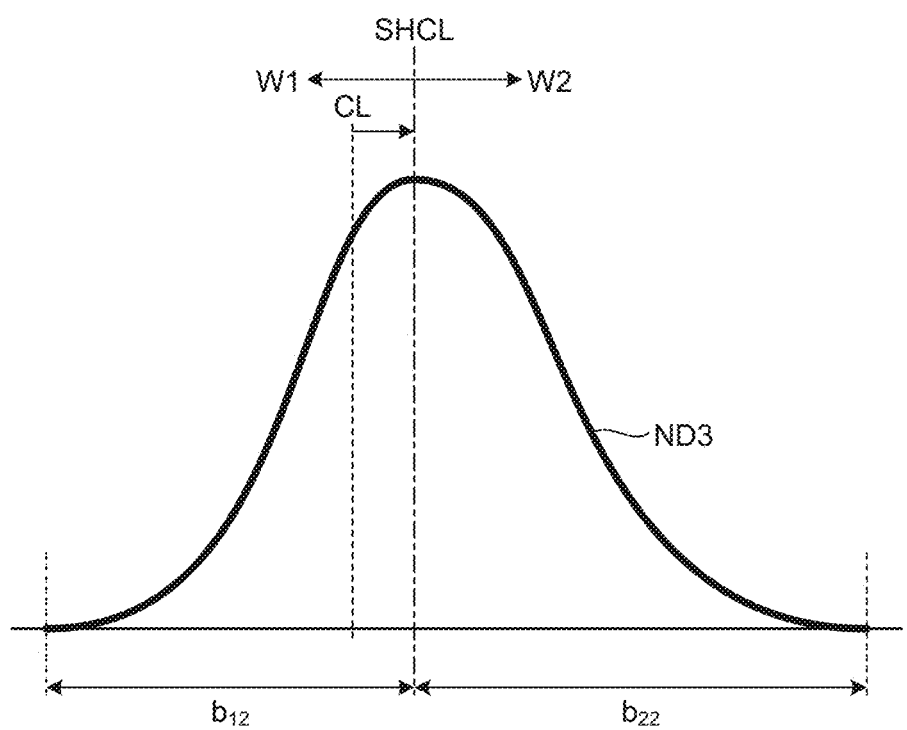
FIG. 12 is a diagram for explaining matters related to a third process.

FIG. 12 is a diagram for explaining matters related to the third process. In the third process, processing is performed to shift a shifted center line SHCL of the blurring area BLU corresponding to the display panel 30 from the center line CL of the display panel 30 that transmits light, depending on the positional misalignment GA.

In the description with reference to the column titled "with misalignment" in FIG. 8, the positional misalignment GA causes the insufficient intensity of the light passing through the other W2 side of the blurring area BLU. In the example illustrated in FIG. 12, the shifted center line SHCL is shifted to the other W2 side with respect to the center line CL in order to reduce the insufficiency in intensity of the light passing through the other W2 side.

In the third process, the spread ($b_{22}$) in the direction of the shift (toward the other W2 side, for example) may be further made larger than the spread ($b_{12}$) on the opposite side (on the one W1 side, for example) with respect to the shifted center line SHCL in the curve ND3. In other words, the third process may include the second process in the processing details thereof. In that case, the side where the spread of the curve ND2 is relatively smaller can be expressed as Expression (7) below. The side where the spread of the curve ND2 is relatively larger can be expressed as Expression (8) below. b. in Expression (7) is $b_{12}$, for example. b, in Expression (8) is $b_{22}$, for example. The symbol s' in Expressions (7) and (8) denotes a value (Round(s)) obtained by rounding off the distance (shift amount s) between the center line CL and the shifted center line SHCL.

$$f(x)=a\times\exp\{-4(x-s')^2/b_-^2\} \qquad (7)$$

$$f(x)=a\times\exp\{-4(x-s')^2/b_+^2\} \qquad (8)$$

In the third process, in the same manner as in the second process, the specific degree to which the third process expands one side of the spread (b) of the Gaussian function curve (to $b_{22}$, for example) according to the direction in which the positional misalignment GA has occurred depends on the amount of the positional misalignment GA, the details of which will be described later with reference to FIG. 22 and later drawings.

Figure 13:
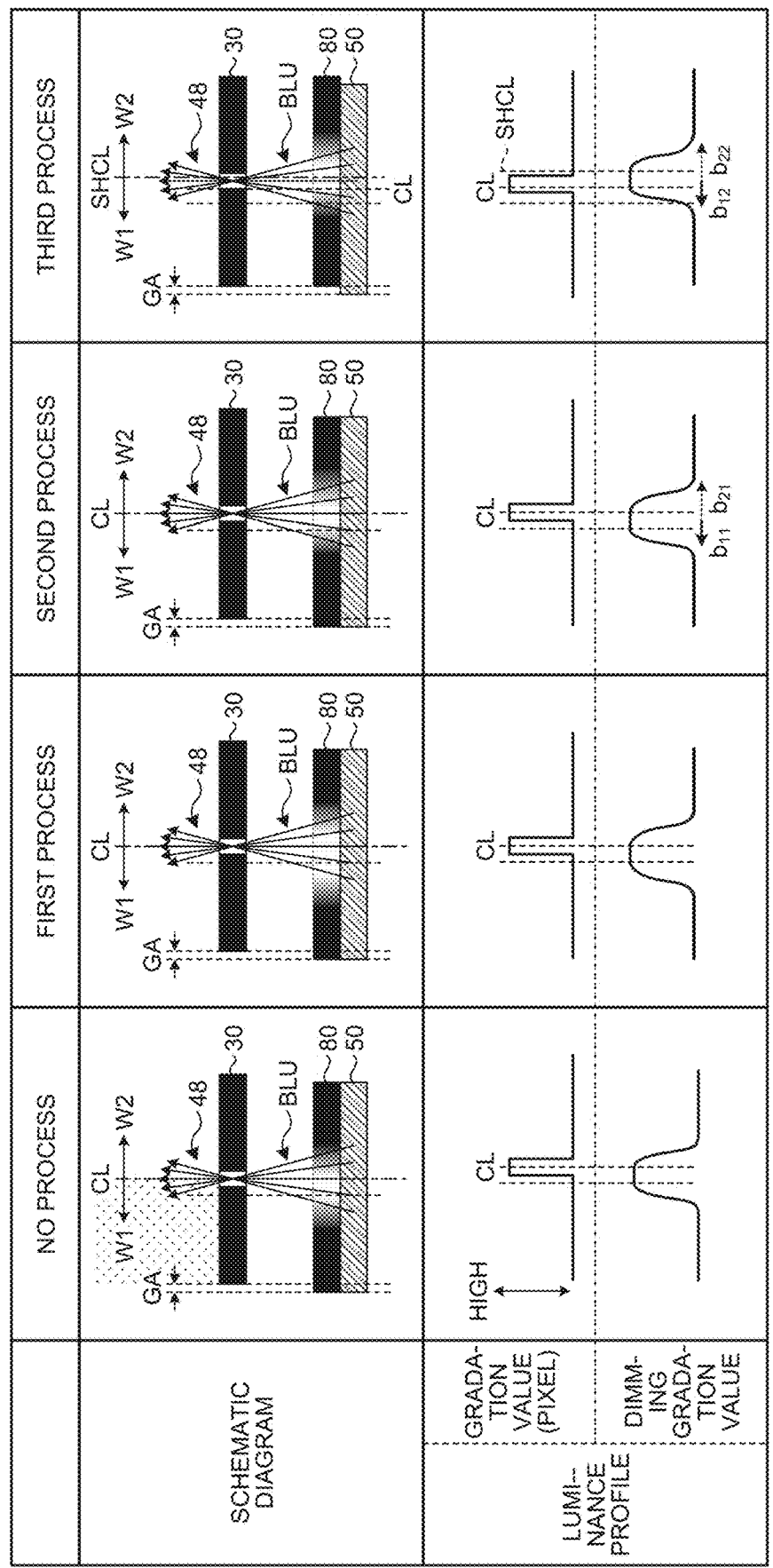
FIG. 13 is a schematic diagram illustrating an operational effect of each of the first, the second, and the third processes.

FIG. 13 is a schematic diagram illustrating an operational effect of each of the first, the second, and the third processes. The case "no process" in FIG. 13 is the same as "with misalignment" in FIG. 8, where the intensity of the light passing through the other W2 side of the dimming panel 80 is insufficient due to the positional misalignment GA, and the light on the one W1 side is insufficient when viewed from the user.

In contrast, the first process expands the area of the blurring area BLU to be larger than that in "no process". The second process makes the spread ($b_{21}$) on the other W2 side of the blurring area BLU larger than the spread ($b_{11}$) on the one W1 side thereof. The third process shifts the shifted center line SHCL of the blurring area BLU toward the other W2 side with respect to the center line CL of the display panel 30. The application of any of the first, the second, and the third processes reduces the insufficiency in intensity of the light passing through the other W2 side of the dimming panel 80.

In FIG. 13, the "luminance profile" row schematically illustrates a relation between the gradation value of the pixel 48 and the Gaussian function curve corresponding to the dimming gradation values of the dimming pixels 148 included in the blurring area BLU for each of "no process", "first process", "second process", and "third process". The details of the luminance profile will be described with reference to FIG. 22 to be explained later.

Figure 14:
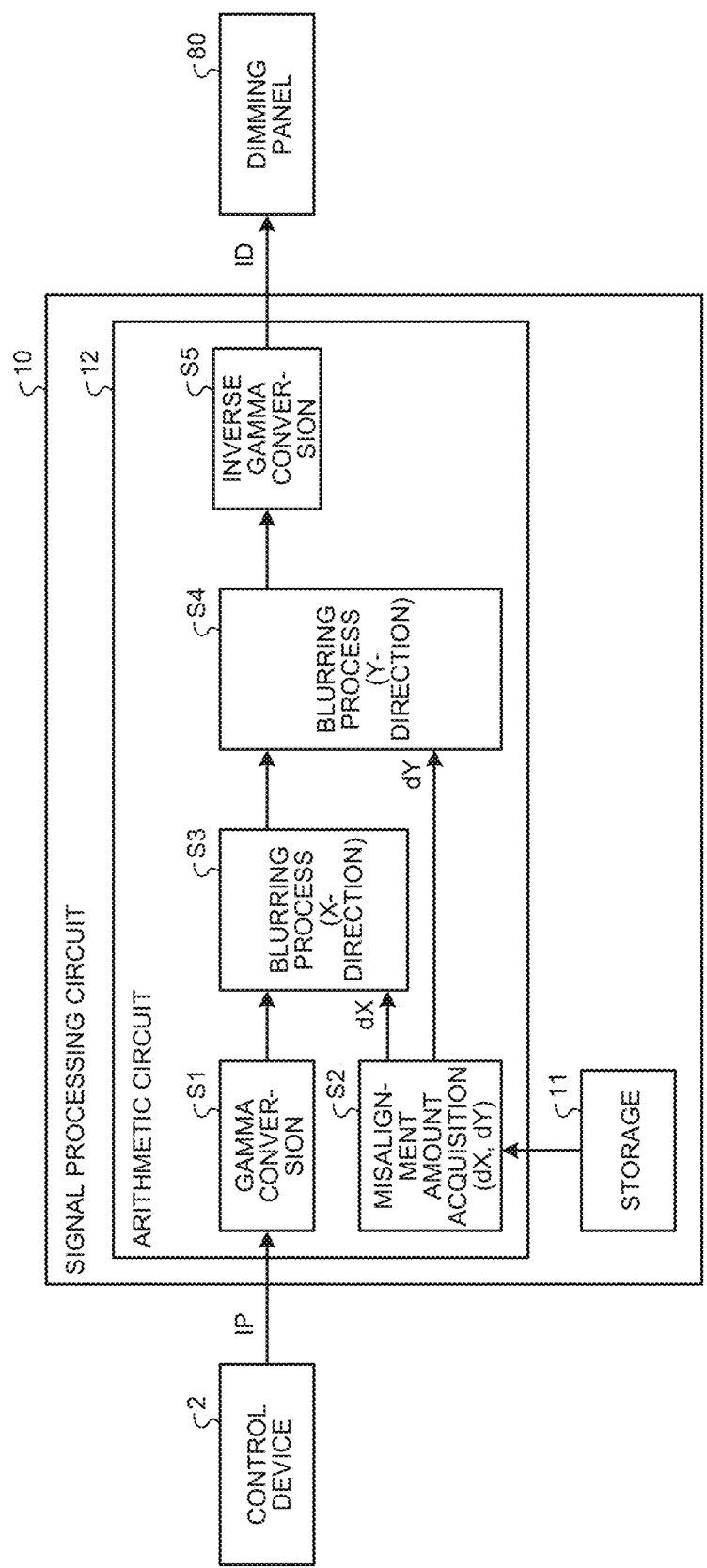
FIG. 14 is a block diagram illustrating an example of processing functions included in a signal processing circuit and the details of the processing.

FIG. 14 is a block diagram illustrating an example of processing functions included in the signal processing circuit 10 and the details of the processing. The signal processing circuit 10 includes a storage 11 and an arithmetic circuit 12. The storage 11 stores therein information indicating the positional misalignment GA between the display panel 30 and the dimming panel 80. Hereafter, an amount of misalignment dX denotes an amount of misalignment in the X-direction between the display panel 30 and the dimming panel 80 that appears as the positional misalignment GA. An amount of misalignment dY denotes an amount of misalignment in the Y-direction between the display panel 30 and the dimming panel 80 that appears as the positional misalignment GA.

The arithmetic circuit 12 has functions to perform gamma conversion S1, misalignment amount acquisition S2, an X-direction blurring process S3, a Y-direction blurring process S4, and inverse gamma conversion S5. An individual circuit may be provided for each of some or all of the gamma conversion S1, the misalignment amount acquisition S2, the X-direction blurring process S3, the Y-direction blurring process S4, and the inverse gamma conversion S5. Alternatively, one circuit may be capable of performing two of more of the gamma conversion S1, the misalignment amount acquisition S2, the X-direction blurring process S3, the Y-direction blurring process S4, and the inverse gamma conversion S5. The arithmetic circuit 12 may have a function as a general-purpose arithmetic circuit that loads and processes a software program supporting all or some of the gamma conversion S1, the misalignment amount acquisition S2, the X-direction blurring process S3, the Y-direction blurring process S4, and the inverse gamma conversion S5. The processing order of the X-direction blurring process S3 and the Y-direction blurring process S4 may be reversed.

When gamma correction is required for obtaining output values from input values, the gamma conversion S1 performs a gamma correction process. The input values herein are RGB gradation values of each of the pixels included in a frame image represented by the input signal IP. The output values represent brightness of the pixel 48 recognized by the user viewing the display area OA when the pixel 48 included in the display panel 30 is controlled at a voltage corresponding to the input values. In the embodiment, the appropriate output values are assumed to be obtained by controlling the pixel 48 in accordance with the input values from the viewpoint of a one-to-one relation between the RGB gradation values and each of the pixels 48, so that no particular adjustment is performed. However, depending on the gamma characteristics of the display panel 30, the gamma correction process is performed.

In the embodiment, the RGB gradation values (input values) represented by pixel data given to the pixel 48 in a certain position by the input signal IP corresponding to one frame image are the same as the RGB gradation values (output values) represented by the pixel data given to the pixel 48 by the output image signal OP based on the input signal IP. Therefore, when Ic denotes the input values and g0(Ic) denotes the output values, an expression Ic=g0(Ic) holds. g0(Ic) can be expressed in the form of the RGB gradation values, that is, $(R,G,B)=(\alpha,\beta,\gamma)$. $\alpha$, $\beta$, and $\gamma$ are numerical values each corresponding to the number of bits of information indicating the gradation value. For example, in the case of eight bits, each of $\alpha$, $\beta$, and $\gamma$ can be a value within a range from 0 to 255.

The misalignment amount acquisition S2 acquires the information indicating the positional misalignment GA from the storage 11. Specifically, the misalignment amount acquisition S2 acquires the amounts of misalignment dX and dY.

The X-direction blurring process S3 performs the blurring processing including an adjustment process corresponding to the amount of misalignment dX of the positional misalignment GA between the position of the display panel 30 and the position of the dimming panel 80. The adjustment process herein is any of the first, the second, and the third processes.

The Y-direction blurring process S4 performs the blurring processing including an adjustment process corresponding to the amount of misalignment dY of the positional misalignment GA between the position of the display panel 30 and the position of the dimming panel 80. The type of the adjustment process applied in the X-direction blurring process S3 may be the same as that of the Y-direction blurring process S4 or different therefrom.

The inverse gamma conversion S5 performs the gamma correction process when the gamma correction is required for the dimming gradation values. In the embodiment, the gamma correction process is performed, for example, such that a gamma curve between a case where both the dimming panel 80 and the display panel 30 are at the lowest gradation (0) and a case where both the dimming panel 80 and the display panel 30 are at the highest gradation (255 in the case of 8-bit gradation) is a desired gamma curve (for example, a gamma curve corresponding to a gamma value of 2.2). When g1 denotes a coefficient used in the gamma correction process, the dimming gradation value after the gamma correction process is performed by the inverse gamma conversion S5 can be expressed as $g1(Ic_{max}+A)$.

In the embodiment, for example, the output image signal OP is output to the display panel 30. The output image signal OP is a set of g0(Ic) described above for each of the pixels 48. Each of the pixels 48 is driven according to g0(Ic) by operation of the display panel driver 40. In the embodiment, for example, the dimming signal DI is output to the dimming panel 80. The dimming signal DI is a set of $g1(Ic_{max}+A)$ mentioned above for each of the dimming pixels 148. Each of the dimming pixels 148 is driven according to $g1(Ic_{max}+A)$ by operation of the dimming panel driver 140. That is, the dimming panel 80 operates such that the degree of transmission of the light through each of the dimming pixels 148 corresponds to the dimming gradation value thereof.

In the embodiment, all the sub-pixels 49 included in one of the dimming pixels 148 are driven so as to have a degree of transmission of light corresponding to the dimming gradation value of the one of the dimming pixels 148. Thus, the frame image corresponding to the input signal IP is displayed in the display area OA, and the dimming pixels 148 to which the blurring processing of the "embodiment" described with reference to FIG. 6 is applied are controlled. Thus, the user can view the frame image corresponding to the input signal IP with sufficient accuracy in both the front view FV and the oblique view DV.

The information indicating the positional misalignment GA is stored in advance in the storage 11. In other words, the information indicating the positional misalignment GA has been written to the storage 11 in advance.

Figure 15:
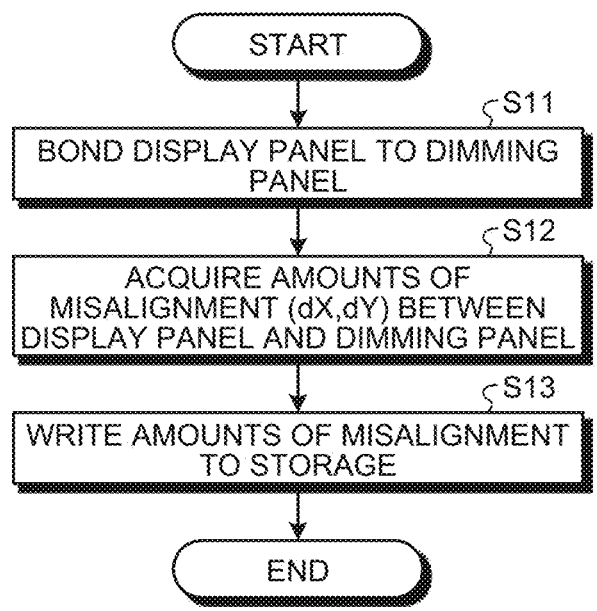
FIG. 15 is a flowchart of processing for writing of amounts of misalignment into a storage.

FIG. 15 is a flowchart of processing for writing the amounts of misalignment to the storage 11. First, an operation is performed to bond the display panel 30 and the dimming panel 80 onto each other (Step S11). After the processing at Step S11, the amounts of misalignment dX and dY between the display panel 30 and the dimming panel 80 are measured (Step S12). After the processing at Step S12, the information indicating the amounts of misalignment dX and dY is written to the storage 11 (Step S13).

The following describes an exemplary method for measuring the amounts of misalignment dX and dY in the processing at Step S12, with reference to FIGS. 16 to 20.

Figure 16:
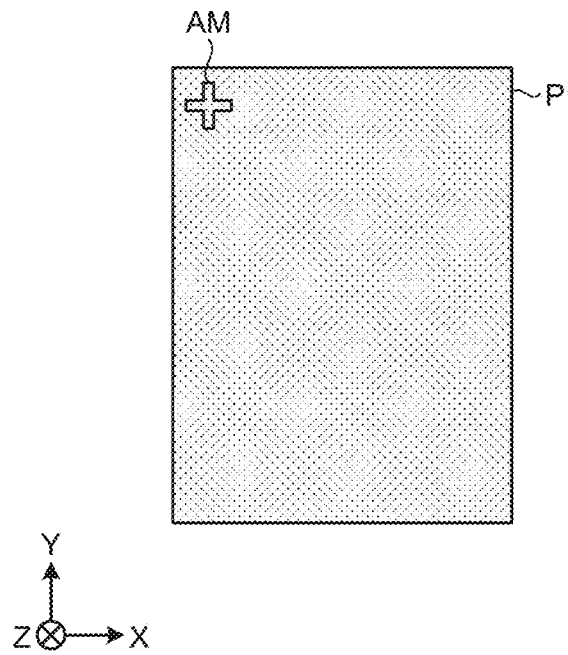
FIG. 16 is a diagram illustrating an example of an alignment mark AM employable in the embodiment.

FIG. 16 is a diagram illustrating an example of an alignment mark AM employable in the embodiment. A panel P illustrated in FIG. 16 is a substrate for at least one of the display panel 30 and the dimming panel 80. As illustrated in FIG. 16, the panel P is provided with the alignment mark AM.

First, a case will be described where the alignment marks AM are provided on both the display panel 30 and the dimming panel 80. In a case where the alignment mark AM is provided on the array substrate 30a of the display panel 30 and the alignment mark AM is also provided on the dimming panel 80, the alignment mark AM for the dimming panel 80 is preferably provided on the first substrate 80a. That is, the sizes of the substrates of the display panel 30 and the dimming panel 80 provided with the alignment marks AM are preferably the same as each other, or closer to each other. When the bonding of the display panel 30 and the dimming panel 80 is completed with no positional misalignment GA, the alignment mark AM of the display panel 30 and the alignment mark AM of the dimming panel 80 are preferably provided so as to fully overlap each other in plan view. The alignment marks AM are preferably located outside the display area OA and the dimming area DA.

Figure 17:
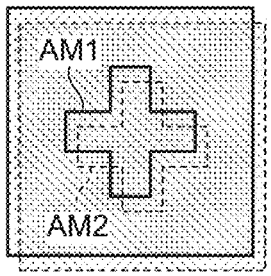
FIG. 17 is a diagram illustrating exemplary relations of overlapping of the alignment marks with the amounts of misalignment.

FIG. 17 is a diagram illustrating exemplary relations of the overlapping of the alignment marks with the amounts of misalignment dX and dY. In FIG. 17, an alignment mark AM1 denotes the alignment mark AM provided on the display panel 30, and an alignment mark AM2 denotes the alignment mark AM provided on the dimming panel 80.

As illustrated in FIG. 17, when the amounts of misalignment dX and dY are both 0, the alignment mark AM2 fully overlaps the alignment mark AM1. In contrast, when at least one of the amounts of misalignment dX and dY is not zero, the alignment mark AM1 is misaligned from the alignment mark AM2 in the X-direction, so that a portion or almost all of the alignment mark AM2 is visible. In other words, a "predetermined positional relation between the display area OA and the dimming area DA" is, for example, the positional relation between the display area OA and the dimming area DA when the amounts of misalignment dX and dY are both 0 in FIG. 17. That is, the "predetermined positional relation between the display area OA and the dimming area DA" refers to a positional relation when the positional relation between an indicator for positional verification provided on the display panel 30 (alignment mark AM1, for example) and an indicator for positional verification provided on the dimming panel 80 (alignment mark AM2, for example) indicates that the ideal positional relation between the display panel 30 and the dimming panel 80 has been established.

In FIG. 17, "the amount of misalignment dX is −X" when the alignment mark AM1 is located on one side in the X-direction and the alignment mark AM2 is located on the other side in the X-direction in the relative positional relation between the alignment mark AM1 and the alignment mark AM2. "The amount of misalignment dX is +X" when the alignment mark AM1 is located on the other side in the X-direction and the alignment mark AM2 is located on the one side in the X-direction. "The amount of misalignment dY is −Y" when the alignment mark AM1 is located on one side in the Y-direction and the alignment mark AM2 is located on the other side in the Y-direction. "The amount of misalignment dY is +Y" when the alignment mark AM1 is located on the other side in the Y-direction and the alignment mark AM2 is located on the one side in the Y-direction. The value of X in "−X" and "+X" represents the magnitude of the amount of misalignment dX. The value of Y in "−Y" and "+Y" represents the magnitude of the amount of misalignment dY. For example, when (dX,dY)=(−X,0), the misalignment between the display panel 30 and the dimming panel 80 occurs where the alignment mark AM1 is located on the one side in the X-direction and the alignment mark AM2 is located on the other side in the X-direction, and the magnitude of the misalignment in the X-direction is indicated as X.

In the processing at Step S12, for example, an observation for measuring the positional relation between the alignment mark AM1 and the alignment mark AM2 described with reference to FIG. 17 is performed in plan view from the display panel 30 side. The information indicating the amounts of misalignment dX and dY measured by this processing is written to the storage 11 in the processing at step S13.

The specific form of the alignment mark is not limited to a cross shape such as that of the alignment mark AM described with reference to FIGS. 16 and 17.

Figures 18, 19:
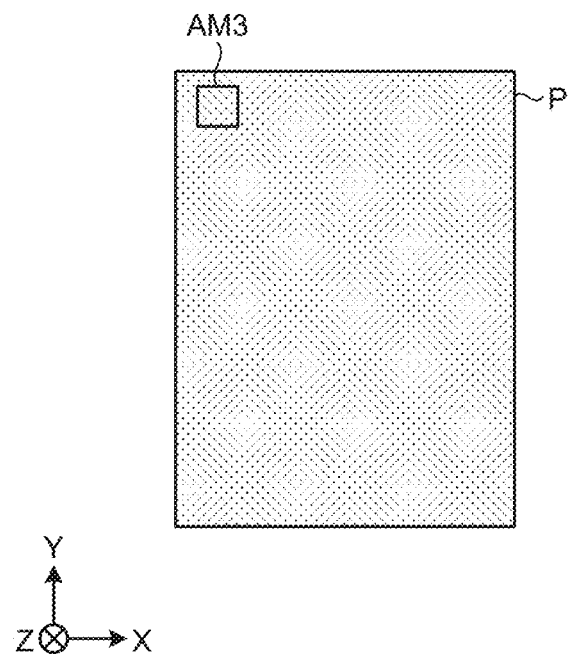
FIG. 18 is a diagram illustrating an example of an alignment mark different from the alignment mark illustrated in FIG. 16.
FIG. 19 is a diagram illustrating an example of measurement of the positional misalignment by combining two types of alignment marks having different shapes.

FIG. 18 is a diagram illustrating an example of an alignment mark AM3 different from the alignment mark AM illustrated in FIG. 16. The panel P may be provided with the alignment mark AM3 illustrated in FIG. 18 instead of the alignment mark AM described with reference to FIG. 16. The alignment mark AM3 has a rectangular shape and is provided on the assumption that the positional misalignment GA is measured based on the positional relation between the four sides of the rectangular shape of this alignment mark and the ends of another alignment mark (for example, the alignment mark AM or the alignment mark AM3).

FIG. 19 is a diagram illustrating an example of the measurement of the positional misalignment GA by combining two types of alignment marks having different shapes. The alignment mark AM1 illustrated in FIG. 19 is provided on the display panel 30, in the same manner as the alignment mark AM1 described with reference to FIG. 17. The alignment mark AM3 illustrated in FIG. 19 is the alignment mark AM3 provided on the dimming panel 80 instead of the alignment mark AM2 described with reference to FIG. 17.

The alignment marks AM1 and AM3 are provided such that, when (dX,dY)=(0,0) as illustrated in the column titled "without misalignment" in FIG. 19, that is, when no positional misalignment GA occurs, the positions of the four projecting ends of the cross of the alignment mark AM1 overlap the positions of the four sides of the alignment mark AM3. Therefore, when at least one of the amounts of misalignment dX and dY is non-zero, a misalignment occurs between a position of a projecting end of the cross of the alignment mark AM1 and a position of a side of the alignment mark AM3, depending on the direction of the positional misalignment GA generated, for example, as illustrated in the column titled "with misalignment" in FIG. 19. The degree of separation between the projecting end of the cross of the alignment mark AM1 and the side of the alignment mark AM3 where the misalignment has occurred indicates the magnitude of the degree of misalignment (X,Y).

Figure 20:
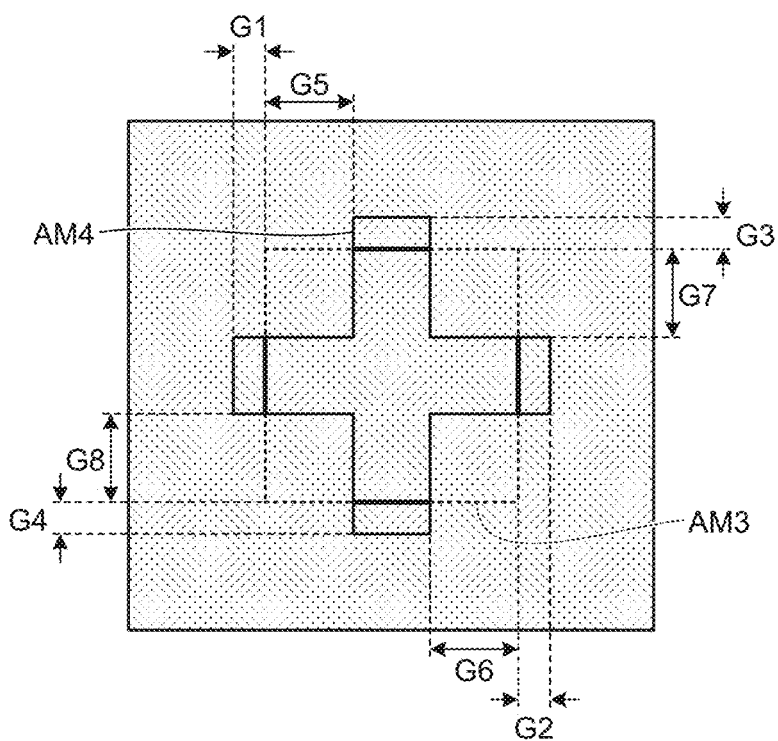
FIG. 20 is a diagram illustrating another example of the measurement of the positional misalignment by combining two types of alignment marks having different shapes.

FIG. 20 is a diagram illustrating another example of the measurement of the positional misalignment GA by combining two types of alignment marks having different shapes. An alignment mark AM4 illustrated in FIG. 20 is provided on the display panel 30 in the same manner as the alignment mark AM1 described with reference to FIG. 19, and, unlike the alignment mark AM1, has greater widths in the X and Y directions than those of the alignment mark AM3. The alignment mark AM3 illustrated in FIG. 20 is provided on the dimming panel 80 in the same manner as the alignment mark AM3 described with reference to FIG. 19.

The alignment marks AM3 and AM4 are provided so as to achieve a positional relation therebetween in which, when (dX,dY)=(0,0), the projecting ends of the cross of the alignment mark AM4 protrude from the four sides of the alignment mark AM3, as illustrated in FIG. 20. The positional relation between the projecting ends of the cross-shaped alignment mark AM4 and the sides of the alignment mark AM3 corresponds to the presence or absence of the positional misalignment GA and the amount of the positional misalignment GA.

To give a specific example, an equality dX=0 holds when distal ends of two of the cross-shaped projecting ends of the alignment mark AM4 extending in the X-direction protrude from the alignment mark AM3 by equal lengths G1 and G2. When the lengths G1 and G2 differ from each other, dX is a value obtained by halving the absolute value of the difference between the lengths G1 and G2. An equality dY=0 holds when distal ends of two of the cross-shaped projecting ends of the alignment mark AM4 extending in the Y-direction protrude from the alignment mark AM3 by equal lengths G3 and G4. When the lengths G3 and G4 differ from each other, dY is a value obtained by halving the absolute value of the difference between the lengths G3 and G4.

According to the same concept, an equality dX=0 holds when lengths G5 and G6 of two of the cross-shaped projecting ends of the alignment mark AM4 extending in the X-direction that do not protrude from the alignment mark AM3 are equal to each other. When the lengths G5 and G6 differ from each other, dX is a value obtained by halving the absolute value of the difference between the lengths G5 and G6. An equality dY=0 holds when lengths G7 and G8 of two of the cross-shaped projecting ends of the alignment mark AM4 extending in the Y-direction that do not protrude from the alignment mark AM3 are equal to each other. When the lengths G7 and G8 differ from each other, dY is a value obtained by halving the absolute value of the difference between the lengths G7 and G8.

The alignment marks are not limited to those illustrated with reference to FIGS. 16 to 20, but the specific shape and size thereof can be changed to any shape and size within ranges that allow the measurement of the positional misalignment GA between the display panel 30 and the dimming panel 80.

When the width of the display area OA in a direction orthogonal to the Z-direction is the same as that of the dimming area DA as illustrated in FIG. 7, the dimming area DA cannot cover a portion of the display area OA when the positional misalignment GA occurs. Therefore, the width of the dimming area DA in the direction orthogonal to the Z-direction may be made larger than that of the display area OA.

FIG. 21 is a diagram illustrating an example in which the width of the dimming area DA in the direction orthogonal to the Z-direction is set to be larger than that of the display area OA. By making the width of the dimming area DA in the direction orthogonal to the Z-direction larger than that of the display area OA as illustrated in the row titled "without misalignment" in FIG. 21, the entire display area OA is made easier to be covered with the dimming area DA, as illustrated in the row titled "with misalignment" in FIG. 21, even if the positional misalignment GA occurs.

The following describes the control of the dimming pixels 148 according to the pixels 48 that are controlled to transmit light.

Figure 22:
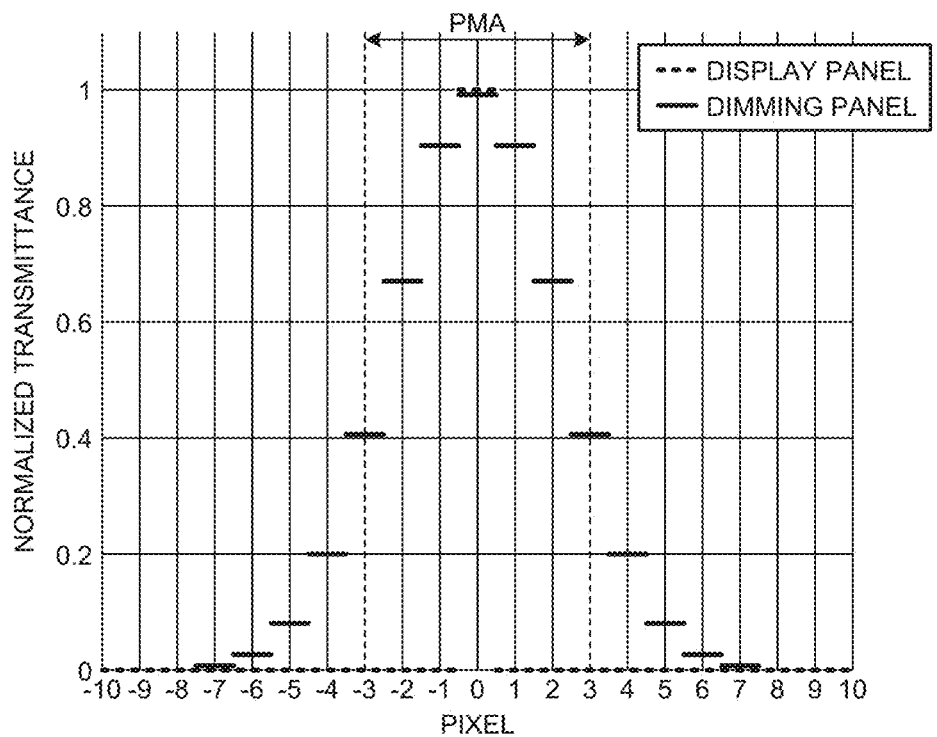
FIG. 22 is a graph illustrating an exemplary relation between normalized transmittance of the pixel and normalized transmittance of dimming pixels according to a luminance profile.

FIG. 22 is a graph illustrating an exemplary relation between normalized transmittance of the pixel 48 and normalized transmittance of the dimming pixels 148 according to the luminance profile. The "normalized transmittance" indicated by the vertical axis of graphs illustrated in FIGS. 22 to 30 and 32 to 46 represents the degree of transmission of light that can be the degree of transmission of each of the pixels 48 and the dimming pixels 148, with the highest state being 1 and the lowest state being 0. For example, when an 8-bit input signal IP is given to the pixel 48, the input signal IP having the highest value (255) corresponds to the normalized transmittance having the highest value (1), and the input signal IP having the lowest value (0) corresponds to the normalized transmittance having the lowest value (0).

A "pixel" range from 0 to +10 indicated by the horizontal axis of the graphs illustrated in FIGS. 22 to 30 and 32 to 46 are set in order to indicate the normalized transmittance of each of the dimming pixels 148 included in a pixel area of 21 pixels 48 including 10 pixels 48 arranged in one side (+) of the X-direction and 10 pixels 48 arranged in the other side (−) of the X-direction (or 10 pixels 48 arranged in one direction of the Y-direction and 10 pixels 48 arranged in the other direction of the Y-direction) with respect to one of the pixels 48 at the center (0). For example, "1" in the horizontal axis direction indicates the position of the pixel 48 adjacent to the one of the pixels 48 at the center (0) and provided on the one side in the X-direction (or Y-direction) with respect to the one pixel 48. The graphs illustrated in FIGS. 22 to 30 and 32 to 46 assume a case where, in the pixel area of 21×21 pixels centered on the one of the pixels 48 including the 21 pixels 48 in the X-direction and the 21 pixels 48 in the Y-direction, only one of the pixels 48 has a normalized transmittance of non-zero, only one of the pixels 48 has a normalized transmittance of 1, and the normalized transmittance of the others of the pixels 48 is 0. That is, the graphs assume a case where the display output is performed such that the pixel area of the 21×21 pixels includes only one bright pixel 48, around which the area being darker.

In each of the graphs illustrated in FIGS. 22 to 30 and 32 to 46, a dashed line indicates the position of the pixel 48 having a normalized transmittance of 1, as the normalized transmittance of the "display panel". In each of the graphs illustrated in FIGS. 22 to 30 and 32 to 46, a solid line indicates the normalized transmittance of each of the dimming pixels 148 considered to be arranged in the horizontal axis direction of the graph, as the normalized transmittance of the "dimming panel". The graphs illustrated in FIGS. 22 to 30 assume that the display panel 30 and the dimming panel 80 are provided such that the pixels 48 correspond to the dimming pixels 148 on a one-to-one basis. In each of the graphs illustrating the normalized transmittance in FIG. 22 and the subsequent drawings, when the normalized transmittance of the dimming panel 80 is to be illustrated in a position overlapping the normalized transmittance of the display panel 30 (pixel 48), the dashed line illustrating the normalized transmittance of the pixel 48 and the solid line illustrating the normalized transmittance of the dimming panel 80 are illustrated so as to be offset from each other, but the dashed line and the solid line indicate the same normalized transmittance (1) in reality.

FIG. 22 illustrates an exemplary correspondence relation between the normalized transmittance of the pixel 48 and the normalized transmittance of the dimming pixels 148 corresponding to the ideal positional relation between the display panel 30 and the dimming panel 80 on the assumption that no positional misalignment GA is present. When the normalized transmittance of the pixel 48 located at the center (0) of the pixel area of the 21 pixels arranged in the horizontal axis direction is 1, the signal processing circuit 10 controls the dimming pixels 148 so as to set the normalized transmittance of the dimming pixel 148 overlapping the pixel 48 at the center in plan view to 1. The signal processing circuit 10 controls the dimming pixels 148 so as to set the normalized transmittance of the dimming pixel 148 located at a distance of +8 or more from the center (0) to 0. The signal processing circuit 10 controls the dimming pixels 148 such that the normalized transmittance of the dimming pixels 148 within a range of +1 to +7 from the center (0) is 0 or higher and the normalized transmittance is made closer to 1 as the position of the dimming pixel 148 is closer to the center (0). In other words, the luminance profile referred to by the signal processing circuit 10 in controlling the dimming pixels 148 is predetermined in advance, for example, as illustrated in FIG. 22, on the assumption of the ideal positional relation between the display panel 30 and the dimming panel 80 assuming no positional misalignment GA. FIG. 22 illustrates the luminance profile in which the normalized transmittance of the dimming pixels 148 located at +3 from the center (0) is controlled to be 0.4. In each of the graphs illustrated in FIGS. 22 to 30 and 32 to 46, a central area PMA is defined as an area of the dimming pixels 148 within +3 from the pixel 48 serving as the center where the normalized transmittance is 1.

As described with reference to FIG. 9, the distribution of the degree of transmission of light of the dimming pixels 148 in the blurring area BLU can be represented by the Gaussian function curve. Thus, in FIG. 22, the normalized transmittance of each of the dimming pixels 148 located within a range of +1 to +7 from the center (0) is determined according to the Gaussian function curve, on the assumption that the center (0) is located at the highest point (a) in FIG. 9 and the width of the spread (b) spans to a position at +8. The configuration of each of the X-direction blurring process S3 and the Y-direction blurring process S4 includes a processing system corresponding to the Gaussian function curve. The processing system is, for example, a circuit that performs arithmetic operations corresponding to arithmetic expressions, or a software program including the arithmetic expressions and the like, and an arithmetic circuit that processes the software program. The function corresponding to the distribution of the degree of transmission of light of the dimming pixels 148 in the blurring area BLU is not limited to the Gaussian function, but may be another probability density function, for example.

Figure 23:
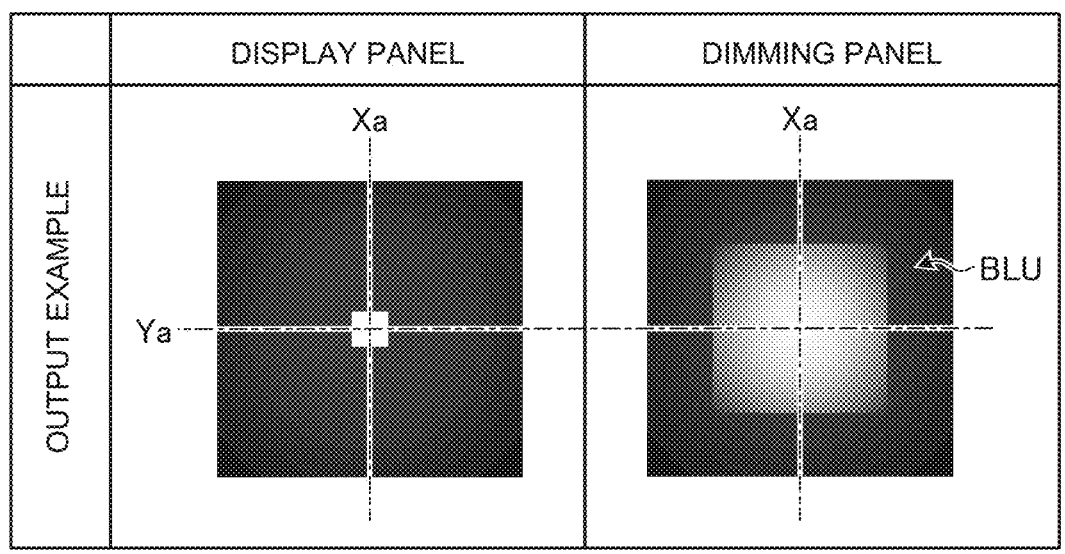
FIG. 23 is a diagram illustrating an exemplary relation between the pixel controlled to transmit light and the blurring area corresponding to the pixel.

FIG. 23 is a diagram illustrating an exemplary relation between the pixel 48 controlled to transmit light and the blurring area BLU corresponding to the pixel 48. The Y-direction blurring process S4 described above takes into account the distribution of the normalized transmittance of the dimming pixels 148 in the blurring area BLU in the X-direction determined by the X-direction blurring process S3. Specifically, in the X-direction blurring process S3, the normalized transmittance values of the dimming pixels 148 included in the blurring area BLU are set to values exceeding zero among the dimming pixels 148 in one row arranged in the X-direction with respect to the highest point (a), that is, with respect to the dimming pixel 148 that ideally overlaps the position of the pixel 48 that transmits light. In the Y-direction blurring process S4, the dimming pixels 148 with the normalized transmittance values set to the values exceeding 0 in the X-direction blurring process S3 are each considered to be the highest point (a) in a corresponding one of the columns, and the Gaussian function curve centered on the highest point (a) is applied to determine the normalized transmittance values of the dimming pixels 148 in each of the columns. This process makes the blurring area BLU to be a light-transmitting area that is centered on the position of the pixel 48 and spreads around the pixel 48 under the ideal condition where no positional misalignment GA is present. A long dashed short dashed line Xa illustrated in FIG. 23 indicates the highest point (a) in the X-direction. A long dashed short dashed line Ya illustrated in FIG. 23 indicates the highest point (a) in the Y-direction. The blurring area BLU is controlled such that the degree of transmission of light is highest at the intersection between the long dashed short dashed line Xa and the long dashed short dashed line Ya, and the degree of transmission of light is made lower as the position of the dimming pixel 148 is located at a larger distance from the intersection. As described above, the blurring processing is performed in the X-direction blurring process S3 and the Y-direction blurring process S4, for example, based on the luminance profile as described with reference to FIG. 22. As a result, the dimming panel 80 performs the output of the blurring area BLU as illustrated in FIG. 23.

Therefore, when the pixels 48 controlled to transmit light, for example, the pixels 48 controlled to be viewed as white, are scattered in the display area OA at a pitch exceeding the width of the blurring area BLU in the X and Y directions, the blurring areas BLU are individually scattered corresponding to the positions of the scattered pixels 48.

Figure 24:
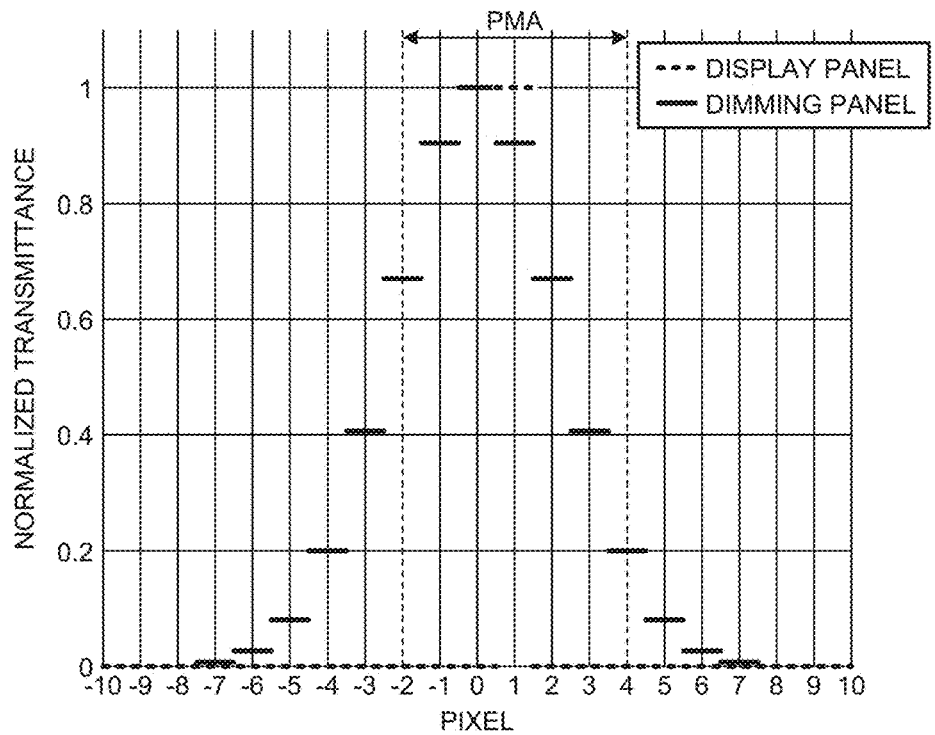
FIG. 24 is a graph illustrating an exemplary relation between the normalized transmittance of the pixel and the normalized transmittance of the dimming pixels when the positional misalignment is present and none of the first, the second, and the third processes is applied.

FIG. 24 is a graph illustrating an exemplary relation between the normalized transmittance of the pixel 48 and the normalized transmittance of the dimming pixels 148 when the positional misalignment GA is present and none of the first, the second, and the third processes is applied. In the example illustrated in FIG. 24, the location of the pixel 48 having a normalized transmittance of 1 is shifted from the center (0) by one pixel in the positive direction, as compared with FIG. 22. That is, the positional misalignment GA by one pixel 48 is present in the direction indicated by the horizontal axis. When none of the first, the second, and the third process is performed in spite of the presence of the positional misalignment GA, the signal processing circuit 10 merely controls the dimming pixels 148 according to a predetermined luminance profile. Since the design assumes the ideal positional relation between the display panel 30 and the dimming panel 80, the signal processing circuit 10 controls each of the dimming pixels 148 under the assumption that the dimming pixel 148 at the center (0) overlaps the pixel 48 having a normalized transmittance of 1 in plan view, even if the location of the pixel 48 is shifted from the center (0) by one pixel in the positive direction. Therefore, the signal processing circuit 10 performs exactly the same control of the dimming pixels 148 as that in the case described with reference to FIG. 22, even though the location of the pixel 48 having a normalized transmittance of 1 is actually misaligned. As a result, the normalized transmittance of the dimming pixels 148 in the pixel area of the 21 pixels 48 in the horizontal axis direction illustrated by the graph in FIG. 24 is the same as that illustrated in FIG. 22. However, the location of the pixel 48 having a normalized transmittance of 1 is different between FIGS. 22 and 24. Therefore, according to the relation between the normalized transmittance of the pixel 48 and the normalized transmittance of the dimming pixels 148 illustrated in FIG. 24, the light is insufficient on one of the sides facing each other with the center line CL interposed therebetween, as described with reference to the column titled "with misalignment" in FIG. 8. Specifically, according to the luminance profile illustrated in FIG. 22, the normalized transmittance of the dimming pixels 148 at the locations of +3 is 0.4. In contrast, in the example illustrated in FIG. 24, the normalized transmittance of the dimming pixel 148 at "+4", which is located at +3 when viewed from the pixel 48 having a normalized transmittance of 1, is only 0.2. Thus, in the example illustrated in FIG. 24, the insufficiency of the normalized transmittance of the dimming pixel 148 due to the positional misalignment GA is significant.

Figure 25:
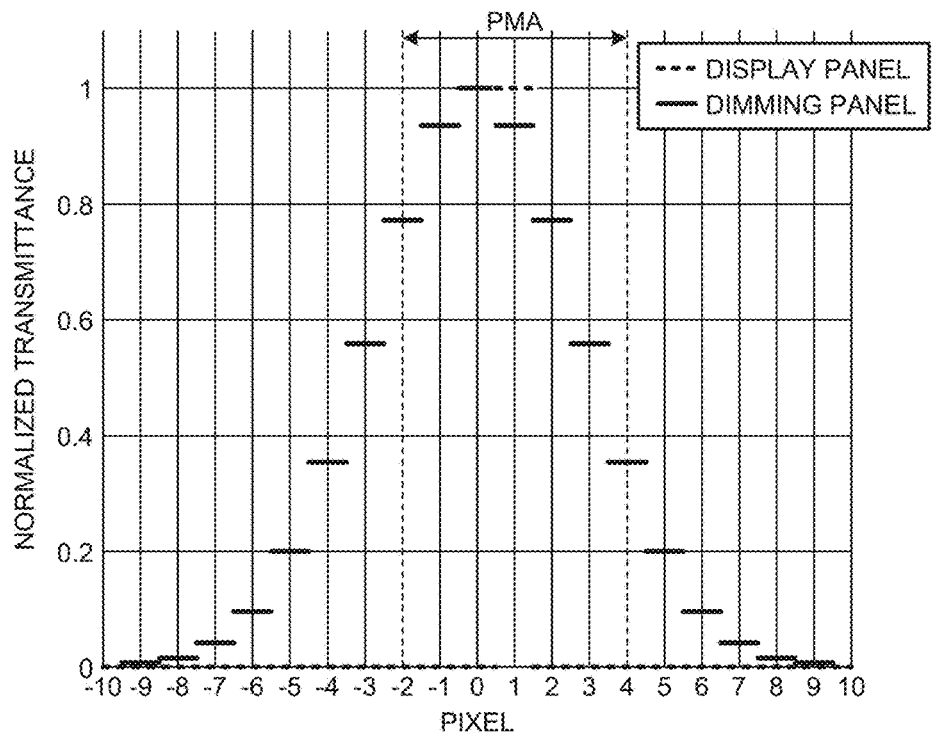
FIG. 25 is a graph illustrating an exemplary relation between the normalized transmittance of the pixel and the normalized transmittance of the dimming pixels when the positional misalignment is present and the first process is applied.
Figure 26:
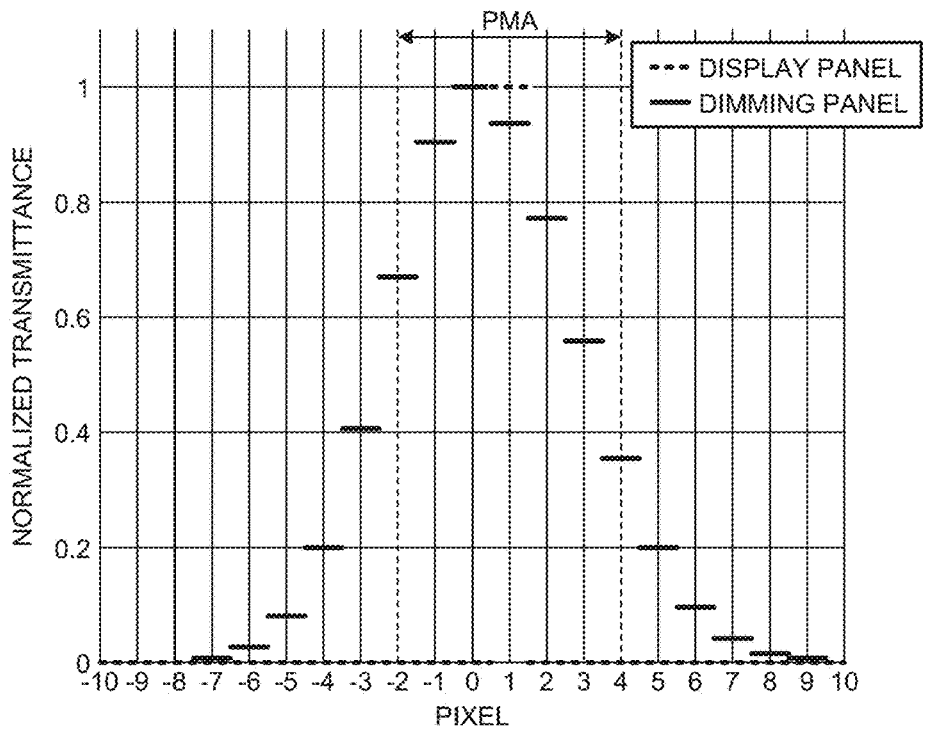
FIG. 26 is a graph illustrating an exemplary relation between the normalized transmittance of the pixel and the normalized transmittance of the dimming pixels when the positional misalignment is present and the second process is applied.
Figure 27:
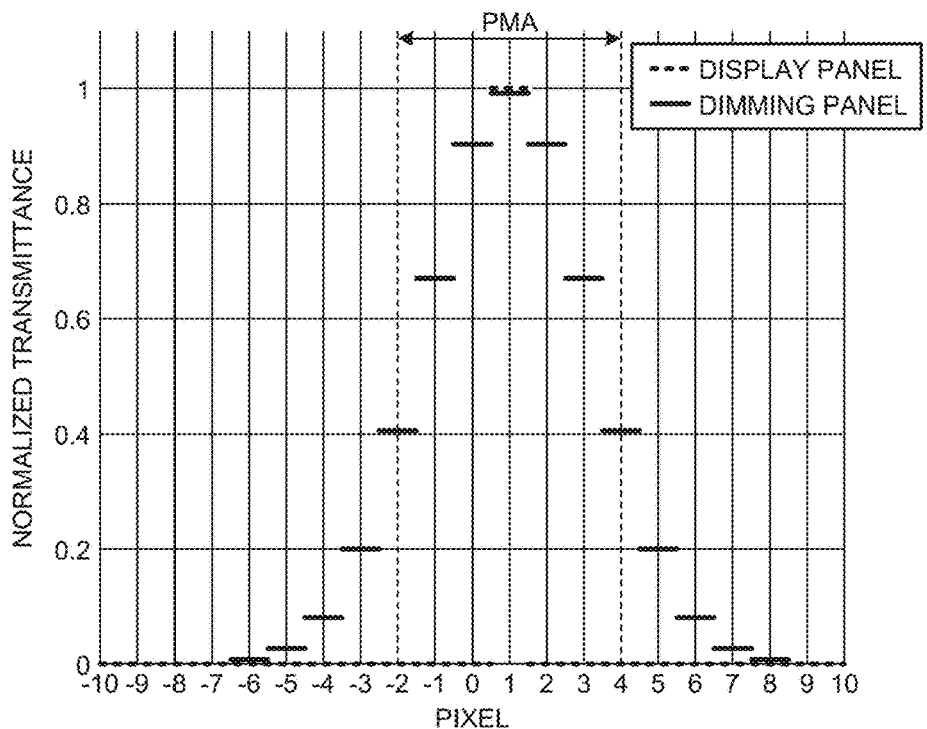
FIG. 27 is a graph illustrating an exemplary relation between the normalized transmittance of the pixel and the normalized transmittance of the dimming pixels when the positional misalignment is present and the third process is applied.

FIG. 25 is a graph illustrating an exemplary relation between the normalized transmittance of the pixel 48 and the normalized transmittance of the dimming pixels 148 when the positional misalignment GA is present and the first process is applied. In FIG. 25 and FIGS. 26 and 27 to be explained later, the position of the pixel 48 having the normalized transmittance of 1 is the same as that in FIG. 24.

As described above, in the luminance profiles illustrated in FIGS. 22 and 24, the width of the spread (b) of the Gaussian function curve spans to the position at ±8. In contrast, in the example illustrated in FIG. 25, the width of the spread (b) is increased to span to a position at ±10 by the application of the first process. As a result, in the example illustrated in FIG. 25, the normalized transmittance of the dimming pixel 148 at "+4", which is located at +3 when viewed from the pixel 48 having a normalized transmittance of 1, is made close to 0.4 (approximately 0.36). Thus, compared with the case where none of the first, the second, and the third processes is applied as described with reference to FIG. 24, the application of the first process can reduce the insufficiency in the normalized transmittance of the dimming pixel 148 that would be caused by the positional misalignment GA. Thus, the first process reduces the insufficiency in intensity of the light that would be caused by the positional misalignment GA.

FIG. 26 is a graph illustrating an exemplary relation between the normalized transmittance of the pixel 48 and the normalized transmittance of the dimming pixels 148 when the positional misalignment GA is present and the second process is applied. In the example illustrated in FIG. 24, the location of the pixel 48 having a normalized transmittance of 1 is shifted by one pixel from the center (0) in the positive direction, resulting in the insufficiency of the normalized transmittance of the dimming pixel 148 located on the positive side in the horizontal axis direction. In the luminance profiles illustrated in FIGS. 22 and 24, the width of the spread (b) of the Gaussian function curve spans to the position at +8. In contrast, in the example illustrated in FIG. 26, according to the same concept as in the example of $b_{21}$ described above, the application of the second process widens the width of the spread (b) of the Gaussian function curve on the positive side to the position at +10. The spread of the Gaussian function curve is smaller on the negative side than on the positive side. As a result, in the example illustrated in FIG. 26, the normalized transmittance of the dimming pixel 148 at "+4", which is located at +3 when viewed from the pixel 48 having a normalized transmittance of 1, is made close to 0.4 (approximately 0.36). Thus, compared with the case where none of the first, the second, and the third processes is applied as described with reference to FIG. 24, the application of the second process can reduce the insufficiency in the normalized transmittance of the dimming pixel 148 that would be caused by the positional misalignment GA. Thus, the second process reduces the insufficiency in intensity of the light that would be caused by the positional misalignment GA.

FIG. 27 is a graph illustrating an exemplary relation between the normalized transmittance of the pixel 48 and the normalized transmittance of the dimming pixels 148 when the positional misalignment GA is present and the third process is applied. In the example illustrated in FIG. 24, the location of the pixel 48 having a normalized transmittance of 1 is shifted by one pixel from the center (0) in the positive direction. In FIGS. 22 and 24, the normalized transmittance values of the dimming pixels 148 are determined on the assumption the center (0) in the horizontal axis direction is the highest point (a) of the Gaussian function curve in FIG. 9. In contrast, in the example illustrated in FIG. 27, the third process is applied to shift the position considered to be the highest point (a) of the Gaussian function curve by one pixel from the center (0) in the positive direction according to the positional misalignment GA. Through this shift, the position where the normalized transmittance of the dimming pixel 148 is 1 is set to be located in the position at +1, and thus overlaps the position where the normalized transmittance of the pixel 48 is 1. The dimming pixels 148 in positions at −2 and +4 that are located in positions at +3 with respect to a position serving as the center where the normalized transmittance of the pixel 48 is 1 both have a normalized transmittance of 0.4. Thus, compared with the case where none of the first, the second, and the third processes is applied as described with reference to FIG. 24, the application of the third process can reduce the insufficiency in the normalized transmittance of the dimming pixels 148 that would be caused by the positional misalignment GA. Thus, the third process reduces the insufficiency in intensity of the light that would be caused by the positional misalignment GA. The third process described with reference to FIG. 27 does not further apply the second process described above.

The positional misalignment GA occurs independently of the pixel pitch of the pixels 48. Therefore, the positional misalignment GA is not limited to being as large as r pixels 48 (where r is a natural number). As an example of a case where the positional misalignment GA is not as large as r pixels 48, the following describes a case where the positional misalignment GA as large as half (0.5) the pixel 48 occurs in the positive horizontal axis direction, with reference to the examples of FIGS. 28 to 30.

Figure 28:
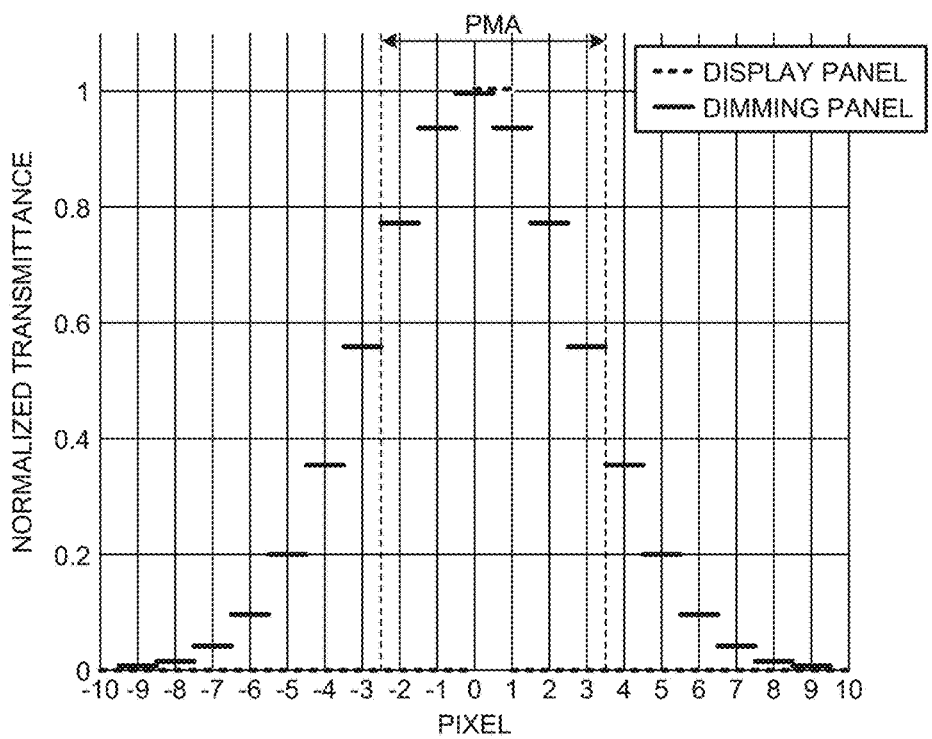
FIG. 28 is a graph illustrating an exemplary relation between the normalized transmittance of the pixel and the normalized transmittance of the dimming pixels when the positional misalignment as large as half (0.5) the pixel is present in the positive horizontal axis direction and the first process is applied.
Figure 29:
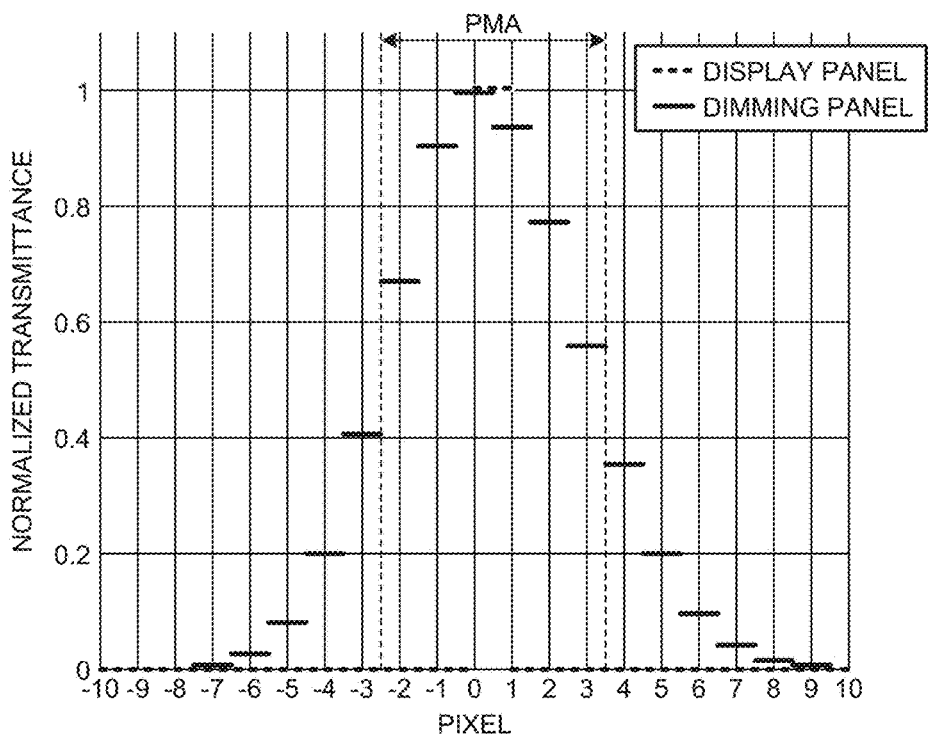
FIG. 29 is a graph illustrating an exemplary relation between the normalized transmittance of the pixel and the normalized transmittance of the dimming pixels when the positional misalignment as large as half (0.5) the pixel is present in the positive horizontal axis direction and the second process is applied.

FIG. 28 is a graph illustrating an exemplary relation between the normalized transmittance of the pixel 48 and the normalized transmittance of the dimming pixels 148 when the positional misalignment GA as large as half (0.5) the pixel 48 is present in the positive horizontal axis direction and the first process is applied. FIG. 29 is a graph illustrating an exemplary relation between the normalized transmittance of the pixel 48 and the normalized transmittance of the dimming pixels 148 when the positional misalignment GA as large as half (0.5) the pixel 48 is present in the positive horizontal axis direction and the second process is applied.

When the first and the second processes are applied and the positional misalignment GA is as large as from r−0.5 to r pixels 48, the signal processing circuit 10 controls each of the dimming pixels 148 so that the same distribution of the normalized transmittance of the dimming pixels 148 as that when the positional misalignment GA is as large as r of the pixels 48 is established. If the degree of positional misalignment does not correspond to a natural number, a natural number closest to the numerical value of the degree of positional misalignment (larger number on the positive or negative side) is employed as the value of the positional misalignment. Therefore, when the positional misalignment GA is 0.5, the normalized transmittance of each of the dimming pixels 148 illustrated in FIG. 25 is the same as the normalized transmittance of a corresponding one of the dimming pixels 148 illustrated in FIG. 28 because this case results in the same as the case where the positional misalignment GA is 1. For the same reason, the normalized transmittance of each of the dimming pixels 148 illustrated in FIG. 26 is the same as the normalized transmittance of a corresponding one of the dimming pixels 148 illustrated in FIG. 29.

Figure 30:
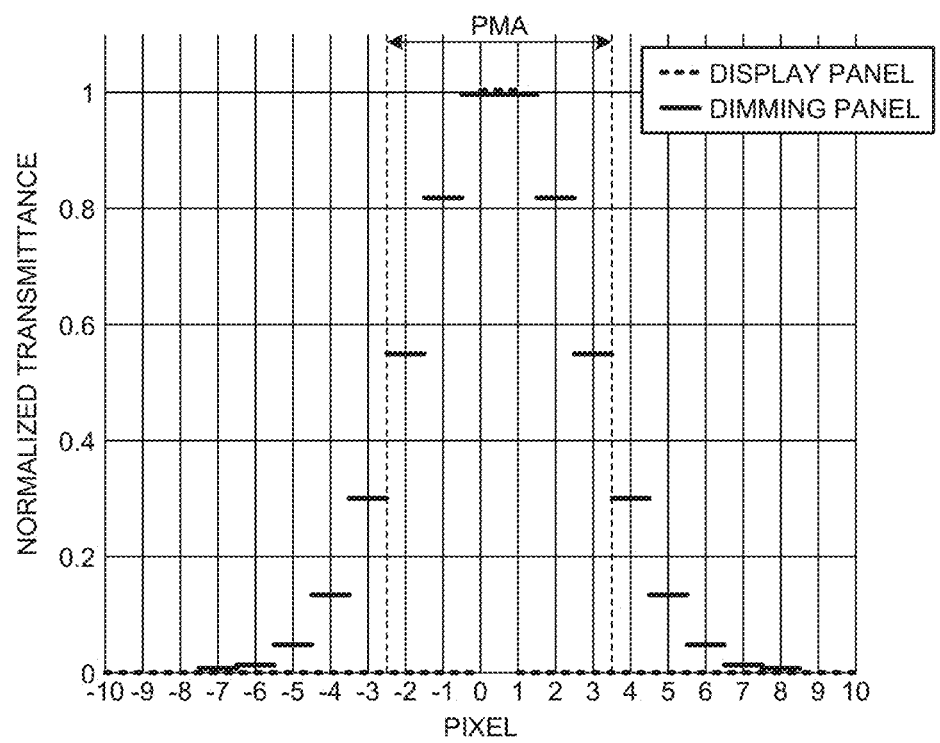
FIG. 30 is a graph illustrating an exemplary relation between the normalized transmittance of the pixel and the normalized transmittance of the dimming pixels when the positional misalignment as large as half (0.5) the pixel is present in the positive horizontal axis direction and the third process is applied.

FIG. 30 is a graph illustrating an exemplary relation between the normalized transmittance of the pixel 48 and the normalized transmittance of the dimming pixels 148 when the positional misalignment GA as large as half (0.5) the pixel 48 is present in the positive horizontal axis direction and the third process is applied. When the pixels 48 and the dimming pixels 148 are in a one-to-one relation and the third process is applied, if the positional misalignment GA is as large as from r–0.5 to r pixels 48, the signal processing circuit 10 obtains the normalized transmittance of each of the dimming pixels 148 by setting the highest point (a) at a location corresponding to the value of the positional misalignment GA and applying the spread (b) of the Gaussian function curve of the luminance profile, and controls the degree of transmission of light of each of the dimming pixels 148 correspondingly to the obtained normalized transmittance. As a result, the normalized transmittance of the dimming pixels 148 illustrated in FIG. 27 is different from the normalized transmittance of the dimming pixels 148 illustrated in FIG. 30. In FIG. 27, the normalized transmittance of the dimming pixels 148 is 0.4 at both ends of the central area PMA, that is, at ±3 with respect to the pixel 48 having a normalized transmittance of 1 serving as the center. Also in FIG. 30, one of the normalized transmittance values of the dimming pixels 148 adjacent to each other with a dashed line interposed therebetween is approximately 0.3, and the other of the normalized transmittance values is approximately 0.55. The dashed line indicates an end of the central area PMA. Considering this relation between the one and the other normalized transmittance values and the distribution (curvature) of the Gaussian function curve, the normalized transmittance assumed in the end position of the central area PMA is approximately 0.4. Therefore, the relation between the highest point (a) and the spread (b) in the normalized transmittance of the dimming pixels 148 is the same in FIGS. 27 and 30.

The signal processing circuit 10 may omit the first, the second, and the third processes if the positional misalignment GA is lower than a threshold. The threshold is preferably, for example, lower than half (0.5) the pixel 48, and may be 0.5 or 0.1 of the pixel 48, for example, or may be another value, and can be changed as appropriate. When the positional misalignment GA is lower than the threshold, the signal processing circuit 10 may apply the first process with a lower degree of expansion of the spread (b) than the first process described with reference to FIG. 25. When the positional misalignment GA is lower than the threshold, the signal processing circuit 10 may apply the second process with a lower degree of expansion of the spread (b) on the shift side of the pixel 48 than the second process described with reference to FIG. 26.

In the discreteness of the degree of transmission of light of each of the dimming pixels 148 (for example, the normalized transmittance described above), the difference in the degree of transmission of light between the adjacent dimming pixels 148 depends on the distribution (curvature) of the Gaussian function curve and the spread (b). In general, the difference in the degree of transmission of light between the adjacent dimming pixels 148 tends to decrease as the spread (b) increases. The difference in the degree of transmission of light between one of the dimming pixels 148 and the adjacent dimming pixel 148 that is relatively farther from the highest point (a) increases as the position of the one of the dimming pixels 148 is closer to the highest point (a).

The degree of increasing the spread (b) in the first process, the degree of expanding the one side of the spread (b) of the Gaussian function curve (to $b_{21}$, for example) according to the direction of the positional misalignment GA in the second process, and the degree of expanding the spread (b) of the Gaussian function curve (to $b_{22}$, for example) according to the direction of the positional misalignment GA in the third process in the same manner as in the second process are based on a common concept. A specific example of the common concept is to set the normalized transmittance of the dimming pixel 148 that is located on a side where the luminance is insufficient due to the positional misalignment GA and located at the end of the central area PMA to an extent reaching an assumed normalized transmittance value. The assumed normalized transmittance value is, for example, approximately 90% of the normalized transmittance of the dimming pixel 148 located at the end of the central area PMA (for example, 0.4 illustrated in FIG. 22) in the case of no positional misalignment GA. In the embodiment, the correspondence relation between the degree of the positional misalignment GA and the degree of increasing the spread (b) is set in advance so as to achieve this extent of percentage. By achieving this extent of percentage, even if the positional misalignment GA is as large as r pixels 48, or even if the amount of the positional misalignment GA is not as large as r pixels 48 and includes a fractional part, a minimum required degree of transmission of light can be given to the dimming pixels 148 regardless of the positional misalignment GA, which can reduce the insufficiency in intensity of the light that would be caused by the positional misalignment GA.

When the first process is applied according to the method for determining the degree of increasing the spread (b) in the first process described above, the blurring area BLU increases as the positional misalignment GA increases. Specifically, a luminance distribution of the blurring area BLU corresponds to the Gaussian function curve having the highest point (a) at the dimming pixel 148 having the highest degree of transmission of light, and the spread (b) of the Gaussian function curve increases as the positional misalignment GA increases.

When the second process is applied, the luminance distribution of the blurring area BLU corresponds to the Gaussian function curve having the highest point (a) at the dimming pixel 148 having the highest degree of transmission of light, and the blurring area BLU has a larger spread on one side than on the other side with the highest point (a) interposed therebetween, the other side being a side located in a direction in which the dimming area DA is misaligned with respect to the display area OA. The spread on the one side of the Gaussian function curve increases as the positional misalignment GA increases.

When the third process is applied, the blurring area BLU is positioned according to the positional misalignment GA so that the dimming pixel 148 having the highest degree of transmission of light overlaps the pixel 48 controlled to be lit up in white (for example, the pixel 48 having a normalized transmittance of 1), as illustrated in the examples in FIGS. 27 and 30. When the pixel 48 controlled to be lit up in white is located in the middle between the adjacent dimming pixels 148, more than one of the dimming pixels 148 having the highest degree of transmission of light in the blurring area BLU are set in the direction of the positional misalignment GA (in the horizontal axis direction of the graph), as illustrated in the example in FIG. 30.

FIGS. 22 to 30 explained above assume that the display panel 30 and the dimming panel 80 are provided such that the pixels 48 correspond to the dimming pixels 148 on a one-to-one basis, but one dimming pixel 148 may cover more than one of the pixels 48. That is, the pixels 48 correspond to the dimming pixels 148 on a q-to-one basis. q is a natural number equal to or larger than 2.

Figure 31:
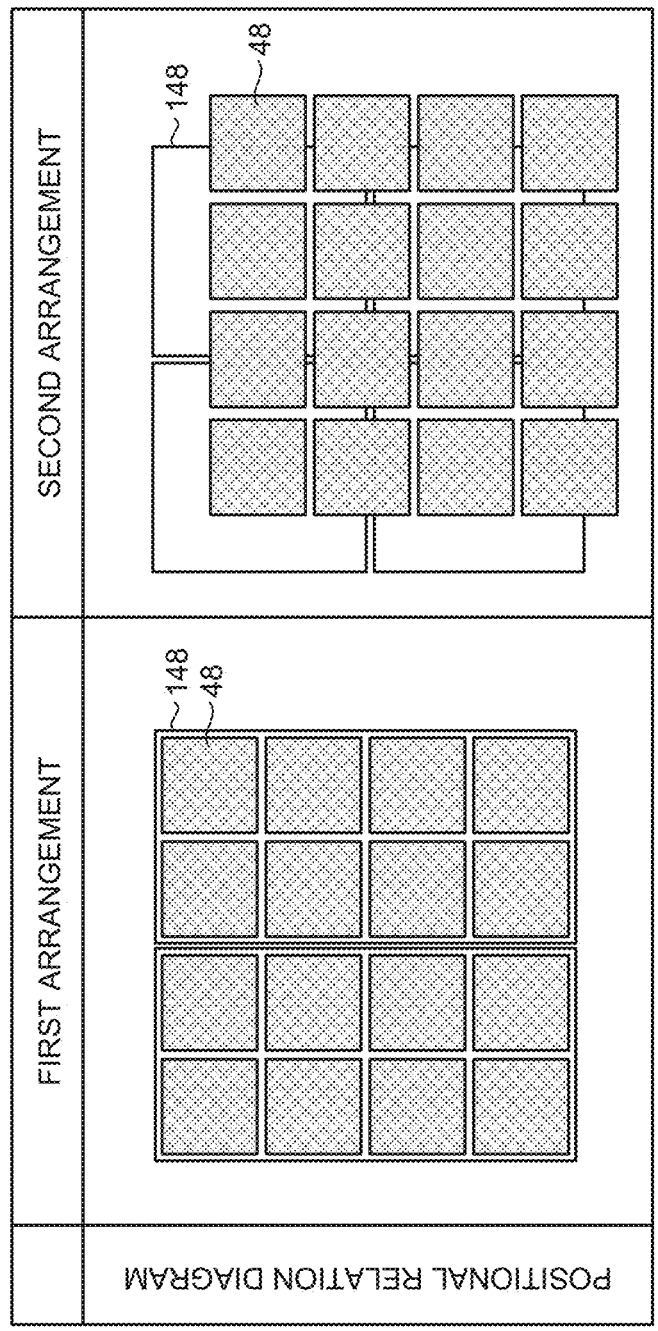
FIG. 31 is a diagram illustrating an exemplary configuration in which one of the dimming pixels covers four of the pixels.

FIG. 31 is a diagram illustrating an exemplary configuration in which one of the dimming pixels 148 covers four of the pixels 48. In the example illustrated in FIG. 31, one dimming pixel 148 covers the pixels 48 in a 2×2 arrangement. That is, q=4 (=2×2) in the example illustrated in FIG. 31. In other words, in the example illustrated in FIG. 31, the ratio of the resolution per unit area of the pixels 48 to the resolution per unit area of the dimming pixels 148 is 4 to 1. The unit area is the size of an area where a natural number of the dimming pixels 148 are arranged.

When the "first arrangement" is assumed as the positional relation between the pixels 48 and the dimming pixels 148 with no positional misalignment GA, the positional relation between the dimming pixels 148 and the pixels 48 is such that one dimming pixel 148 includes four of the pixels 48 in plan view, and no pixels 48 are located on the boundaries between the adjacent dimming pixels 148. In contrast, when the positional misalignment GA occurs in this case, the pixels 48 may be located on the boundaries between the adjacent dimming pixels 148, as illustrated in the column titled "second arrangement", depending on the amount of the positional misalignment GA.

The following describes, as examples when the pixels 48 and the dimming pixels 148 are in a q-to-one relation, the normalized transmittance of the dimming pixels 148 when q=4, with reference to FIGS. 32 to 46.

Figure 32:
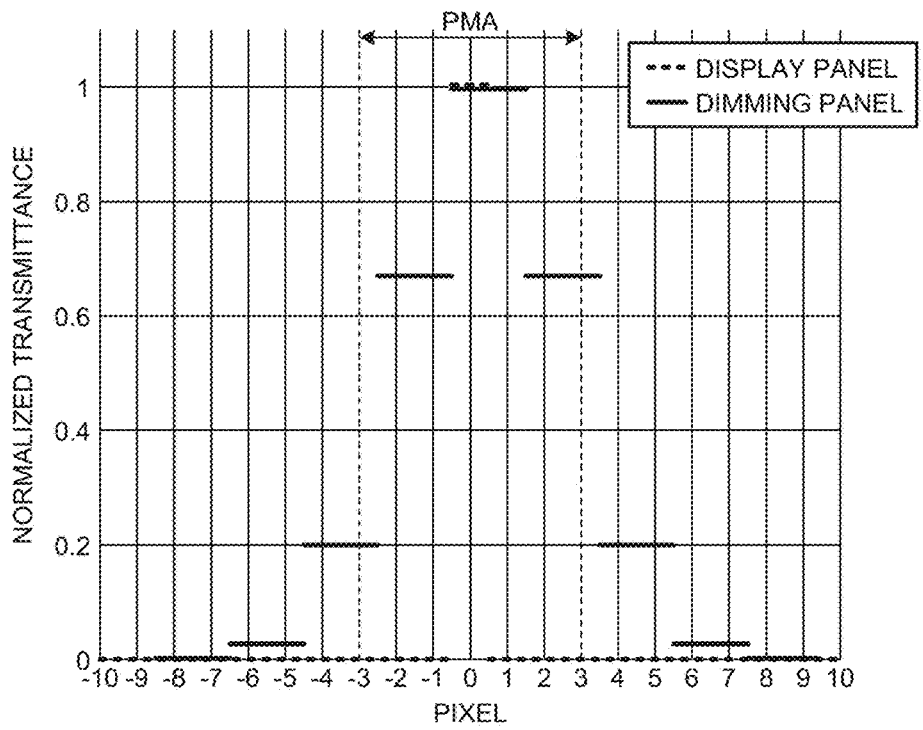
FIG. 32 is a graph illustrating an exemplary correspondence relation between the normalized transmittance of the pixel and the normalized transmittance of the dimming pixels corresponding to an ideal positional relation between the display panel and the dimming panel on the assumption that no positional misalignment is present.

FIG. 32 is a graph illustrating an exemplary correspondence relation between the normalized transmittance of the pixel 48 and the normalized transmittance of the dimming pixels 148 corresponding to the ideal positional relation between the display panel 30 and the dimming panel 80 on the assumption that no positional misalignment GA is present. In the examples illustrated in FIG. 32 and FIGS. 33 and 34 to be explained later, none of the first, the second, and the third processes is applied. Since q=4, that is, the pixels 48 and the dimming pixels 148 are in the four-to-one relation, the correspondence relation between the pixels 48 and the dimming pixels 148 in the horizontal axis direction is two to 1 in the example illustrated in FIG. 32. Therefore, in the example illustrated in FIG. 32, the normalized transmittance of one dimming pixel 148 covers an area of two pixels 48. As illustrated in the column titled "first arrangement" in FIG. 31, the pixels 48 are not located in the center of the dimming pixel 148. When the resolution of the pixels 48 is used as a reference, the resolution of the dimming pixels 148 is half the reference. Because of these circumstances, in FIG. 32, the highest point of the Gaussian function curve drawn by the normalized transmittance of the dimming pixels 148 does not coincide with the center position of the pixel 48 in the horizontal axis direction where the normalized transmittance is 1. In the example illustrated in FIG. 32, the center position in the horizontal axis direction of the pixel 48 that has a normalized transmittance of 1 is shifted by half (−0.5) the pixel 48 in the horizontal axis direction from the highest point of the Gaussian function curve drawn by the normalized transmittance values of the dimming pixels 148.

Figure 33:
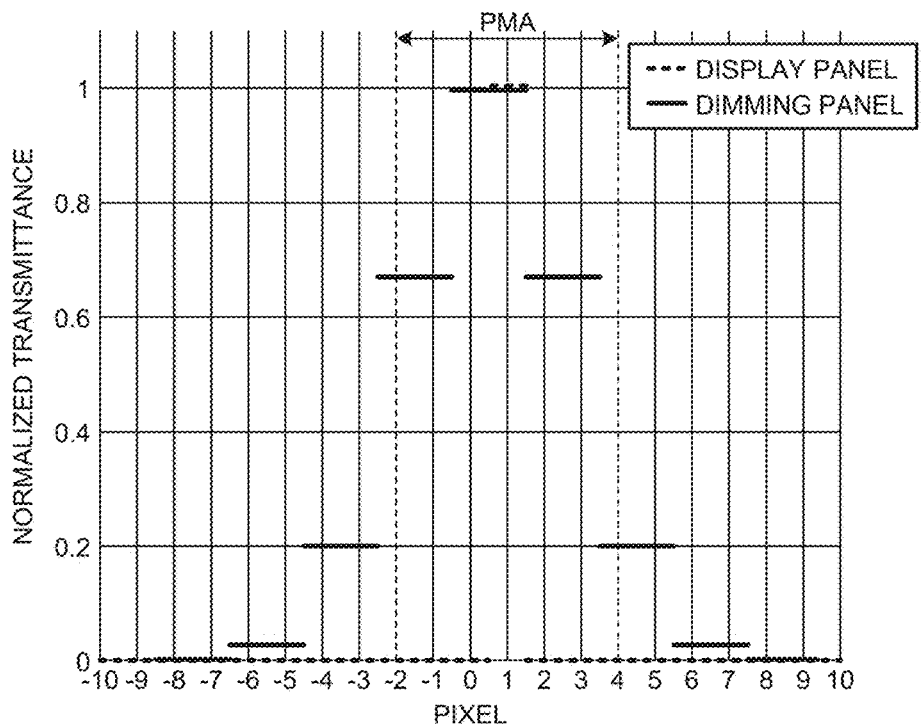
FIG. 33 is a graph illustrating an exemplary correspondence relation between the normalized transmittance of the pixel and the normalized transmittance of the dimming pixels when the positional misalignment is by one pixel and a dimming pixel that overlaps the pixel having a normalized transmittance of 1 is the same as that with no positional misalignment.

FIG. 33 is a graph illustrating an exemplary correspondence relation between the normalized transmittance of the pixel 48 and the normalized transmittance of the dimming pixels 148 when the positional misalignment GA is by one pixel 48 and the dimming pixel 148 that overlaps the pixel 48 having a normalized transmittance of 1 is the same as that with no positional misalignment GA. In FIG. 33, due to the occurrence of the positional misalignment GA, the position in the horizontal axis direction of the pixel 48 having a normalized transmittance of 1 is shifted by one pixel 48 in the positive direction compared with the example illustrated in FIG. 32. In contrast, the dimming pixel 148 that overlaps the pixel 48 having a normalized transmittance of 1 is the same in both FIGS. 32 and 33. Therefore, it can be said that the blurring area BLU for the pixel 48 having a normalized transmittance of 1 is simply inverted in the horizontal axis direction. Therefore, considering that FIG. 32 illustrates the correspondence relation between the normalized transmittance of the pixel 48 and the normalized transmittance of the dimming pixels 148 corresponding to the ideal positional relation between the display panel 30 and the dimming panel 80, the correspondence relation illustrated in FIG. 33 allows the display device 1 to achieve substantially the same brightness of the image as that in the ideal case even if none of the first, the second, and the third processes is performed.

Figure 34:
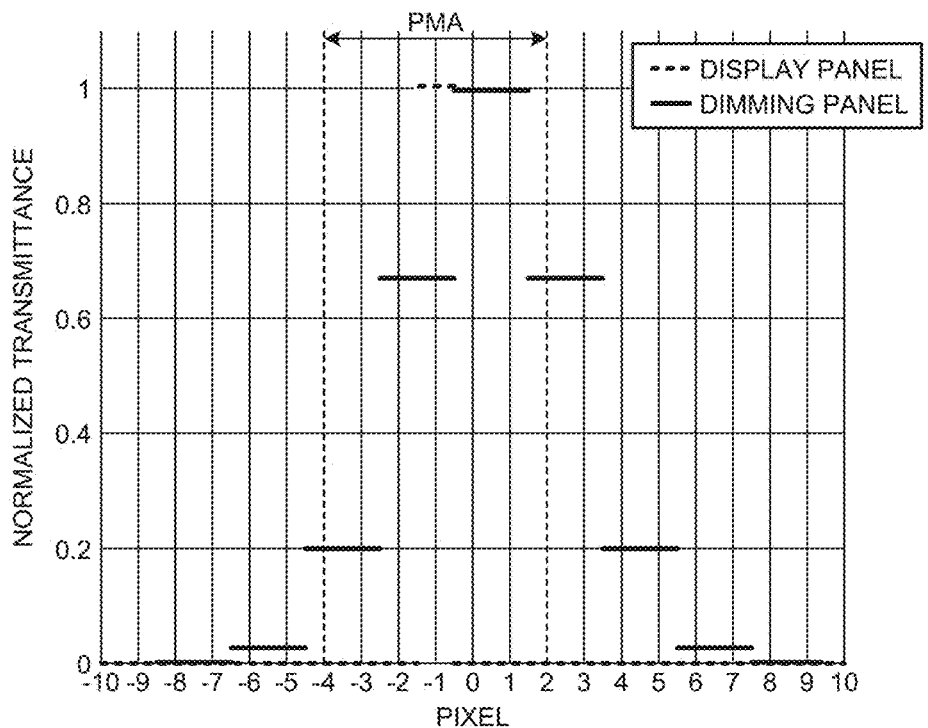
FIG. 34 is a graph illustrating an exemplary correspondence relation between the normalized transmittance of the pixel and the normalized transmittance of the dimming pixels when the positional misalignment is by one pixel and the dimming pixel that overlaps the pixel having a normalized transmittance of 1 differs from that with no positional misalignment.

FIG. 34 is a graph illustrating an exemplary correspondence relation between the normalized transmittance of the pixel 48 and the normalized transmittance of the dimming pixels 148 when the positional misalignment GA is by one pixel 48 and the dimming pixel 148 that overlaps the pixel 48 having a normalized transmittance of 1 differs from that with no positional misalignment GA. In FIG. 34, due to the occurrence of the positional misalignment GA, the position in the horizontal axis direction of the pixel 48 having a normalized transmittance of 1 is shifted by one pixel 48 in the negative direction compared with the example illustrated in FIG. 32. In FIG. 32 where no positional misalignment GA occurs, the pixel 48 having a normalized transmittance of 1 overlaps the dimming pixel 148 having a normalized transmittance of 1. In FIG. 34, however, the pixel 48 having a normalized transmittance of 1 overlaps the dimming pixel 148 having a normalized transmittance of lower than 1. In the example illustrated in FIG. 34, none of the first, the second, and the third processes is performed. Therefore, the brightness is insufficient on the negative side in the example illustrated in FIG. 34.

Figure 35:
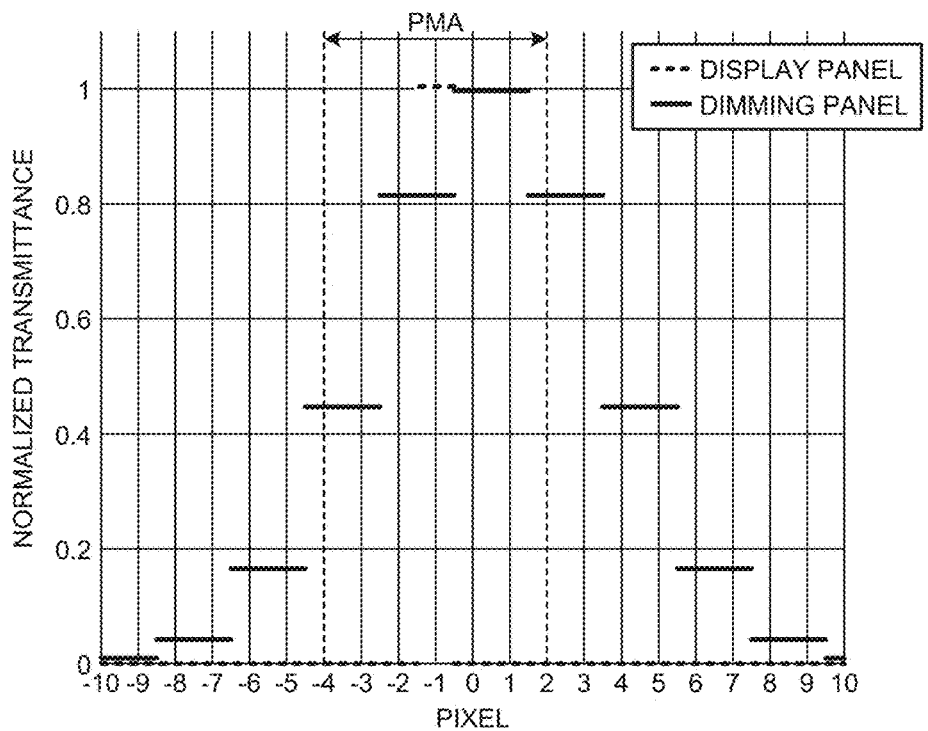
FIG. 35 is a graph illustrating an exemplary correspondence relation between the normalized transmittance of the pixel and the normalized transmittance of the dimming pixels when the first process is applied to the example illustrated in FIG. 34.

FIG. 35 is a graph illustrating an exemplary correspondence relation between the normalized transmittance of the pixel 48 and the normalized transmittance of the dimming pixels 148 when the first process is applied to the example illustrated in FIG. 34. In the luminance profiles illustrated in FIGS. 32 to 34, the width of the spread (b) of the Gaussian function curve is approximately ±7. In contrast, in the example illustrated in FIG. 35, the application of the first process expands the spread (b) to positions where the width exceeds ±10. As a result, in the example illustrated in FIG. 35, the normalized transmittance of the dimming pixel 148 that is located at +3 (dashed line position in the central area PMA) when viewed from the pixel 48 having a normalized transmittance of 1, is made close to 0.4. Thus, compared with the case where none of the first, the second, and the third processes is applied as described with reference to FIG. 34, the application of the first process can reduce the insufficiency in the normalized transmittance of the dimming pixels 148 that would be caused by the positional misalignment GA. Thus, the first process reduces the insufficiency in intensity of the light that would be caused by the positional misalignment GA. In the example illustrated in FIG. 34, the normalized transmittance of the dimming pixel 148 in the position overlapping the pixel 48 having a normalized transmittance of 1 on the display panel 30 is approximately 0.67. In contrast, in the example illustrated in FIG. 35, the normalized transmittance of the dimming pixel 148 in the position overlapping the pixel 48 having a normalized transmittance of 1 on the display panel 30 is approximately 0.8. Thus, the first process can reduce the insufficiency in intensity of the light.

Figure 36:
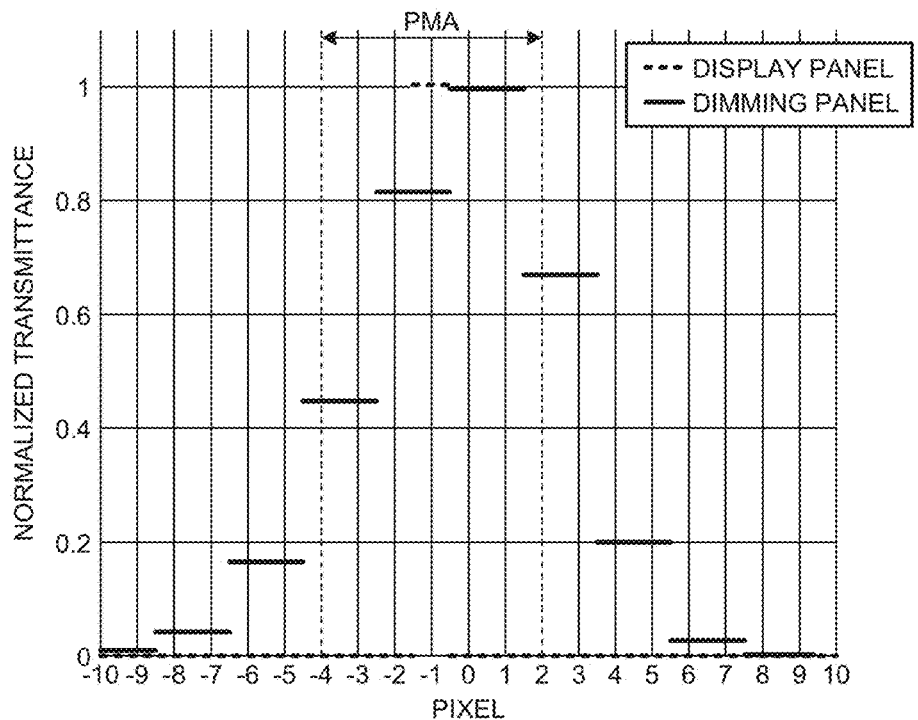
FIG. 36 is a graph illustrating an exemplary correspondence relation between the normalized transmittance of the pixel and the normalized transmittance of the dimming pixels when the second process is applied to the example illustrated in FIG. 34.

FIG. 36 is a graph illustrating an exemplary correspondence relation between the normalized transmittance of the pixel 48 and the normalized transmittance of the dimming pixels 148 when the second process is applied to the example illustrated in FIG. 34. In the example illustrated in FIG. 34, the location of the pixel 48 having a normalized transmittance of 1 is shifted by one pixel from the center (0) in the negative direction, resulting in the insufficiency of the normalized transmittance of the dimming pixel 148 located on the negative side in the horizontal axis direction. In the luminance profile illustrated in FIG. 34, the width of the spread (b) of the Gaussian function curve on the negative side spans to a position near −7. In contrast, in the example illustrated in FIG. 36, according to the same concept as in the example of $b_{21}$ described above, the application of the second process widens the width of the spread (b) of the Gaussian function curve on the negative side to a position near −10. As a result, in the example illustrated in FIG. 36, the normalized transmittance of the dimming pixel 148 that is located at −3 when viewed from the pixel 48 having a normalized transmittance of 1 is made close to 0.4. Thus, compared with the case where none of the first, the second, and the third processes is applied as described with reference to FIG. 34, the application of the second process can reduce the insufficiency in the normalized transmittance of the dimming pixel 148 that would be caused by the positional misalignment GA. Thus, the second process reduces the insufficiency in intensity of the light that would be caused by the positional misalignment GA. In the example illustrated in FIG. 34, the normalized transmittance of the dimming pixel 148 in the position overlapping the pixel 48 having a normalized transmittance of 1 on the display panel 30 is approximately 0.67. In contrast, in the example illustrated in FIG. 36, the normalized transmittance of the dimming pixel 148 in the position overlapping the pixel 48 having a normalized transmittance of 1 on the display panel 30 is approximately 0.8. Thus, the second process can reduce the insufficiency in intensity of the light.

Figure 37:
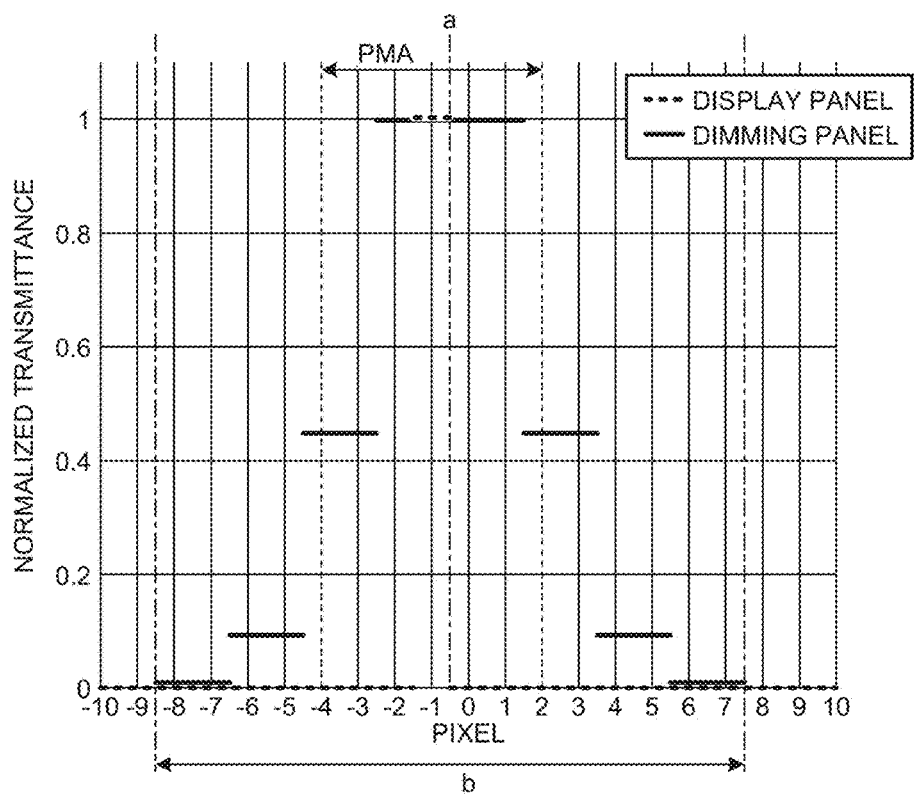
FIG. 37 is a graph illustrating an exemplary correspondence relation between the normalized transmittance of the pixel and the normalized transmittance of the dimming pixels when the third process is applied to the example illustrated in FIG. 34.

FIG. 37 is a graph illustrating an exemplary correspondence relation between the normalized transmittance of the pixel 48 and the normalized transmittance of the dimming pixels 148 when the third process is applied to the example illustrated in FIG. 34. When the pixels 48 and the dimming pixels 148 are in the q-to-one relation and the third process is applied, the signal processing circuit 10 obtains the normalized transmittance of each of the dimming pixels 148 by setting the highest point (a) at a location corresponding to the value of the positional misalignment GA and applying the spread (b) of the Gaussian function curve of the luminance profile, and controls the degree of transmission of light of each of the dimming pixels 148 correspondingly to the obtained normalized transmittance. As a result, the normalized transmittance of the dimming pixels 148 illustrated in FIG. 32 is different from the normalized transmittance of the dimming pixels 148 illustrated in FIG. 37. However, considering the distribution (curvature) of the Gaussian function curve traced by the normalized transmittance of the dimming pixels 148, the relations between the highest point (a) and the spread (b) in the normalized transmittance of the dimming pixels 148 are substantially identical to each other. That is, even when the positional misalignment GA occurs, the third process can ensure substantially the same brightness as that when no positional misalignment GA occurs. Thus, the third process reduces the insufficiency in intensity of the light that would be caused by the positional misalignment GA. In the example illustrated in FIG. 34, the normalized transmittance of the dimming pixel 148 in the position overlapping the pixel 48 having a normalized transmittance of 1 on the display panel 30 is approximately 0.67. In contrast, in the example illustrated in FIG. 37, the normalized transmittance of the dimming pixel 148 in the position overlapping the pixel 48 having a normalized transmittance of 1 on the display panel 30 is 1. Thus, the third process can reduce the insufficiency in intensity of the light. In the example illustrated in FIG. 37, the third process extends the negative side of a portion on the dimming panel where the normalized transmittance is 1 to a position at −2.5.

Figure 38:
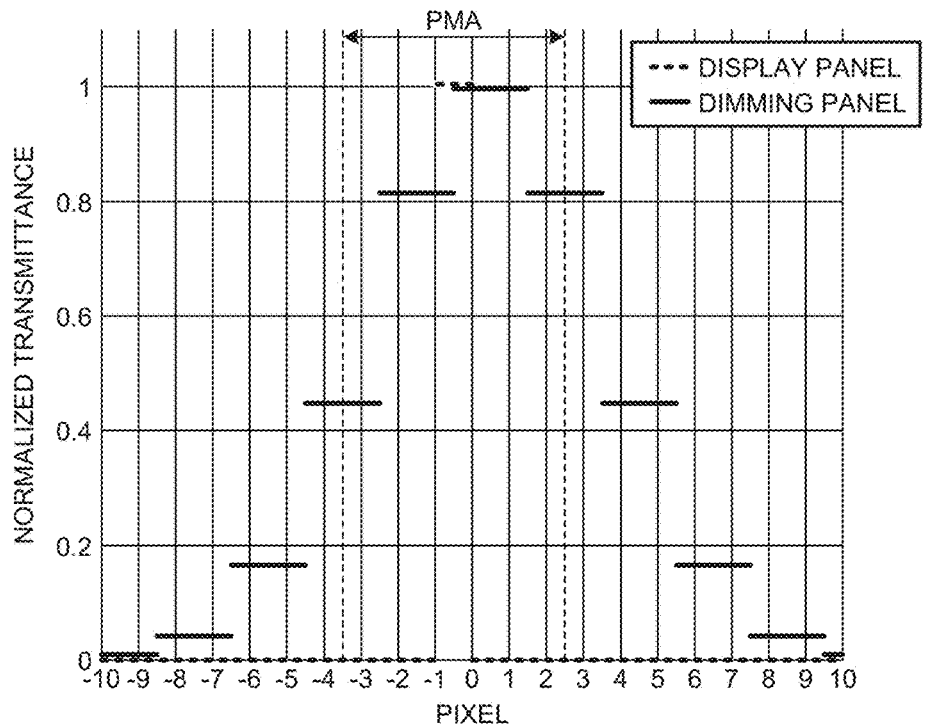
FIG. 38 is a graph illustrating an exemplary correspondence relation between the normalized transmittance of the pixel and the normalized transmittance of the dimming pixels when the first process is applied.
Figure 39:
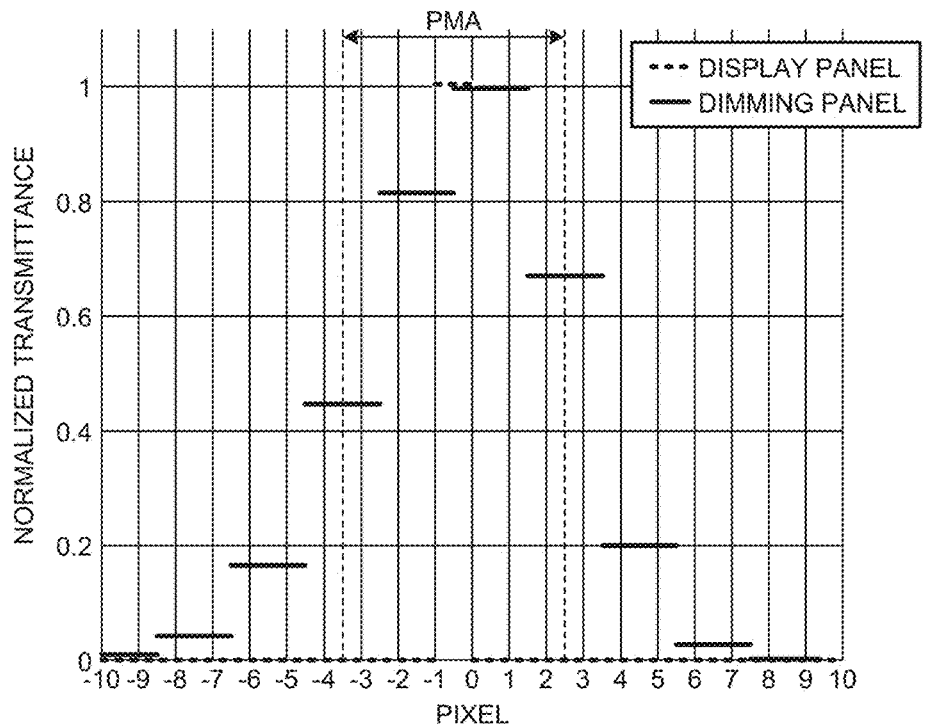
FIG. 39 is a graph illustrating an exemplary correspondence relation between the normalized transmittance of the pixel and the normalized transmittance of the dimming pixels when the second process is applied.
Figure 40:
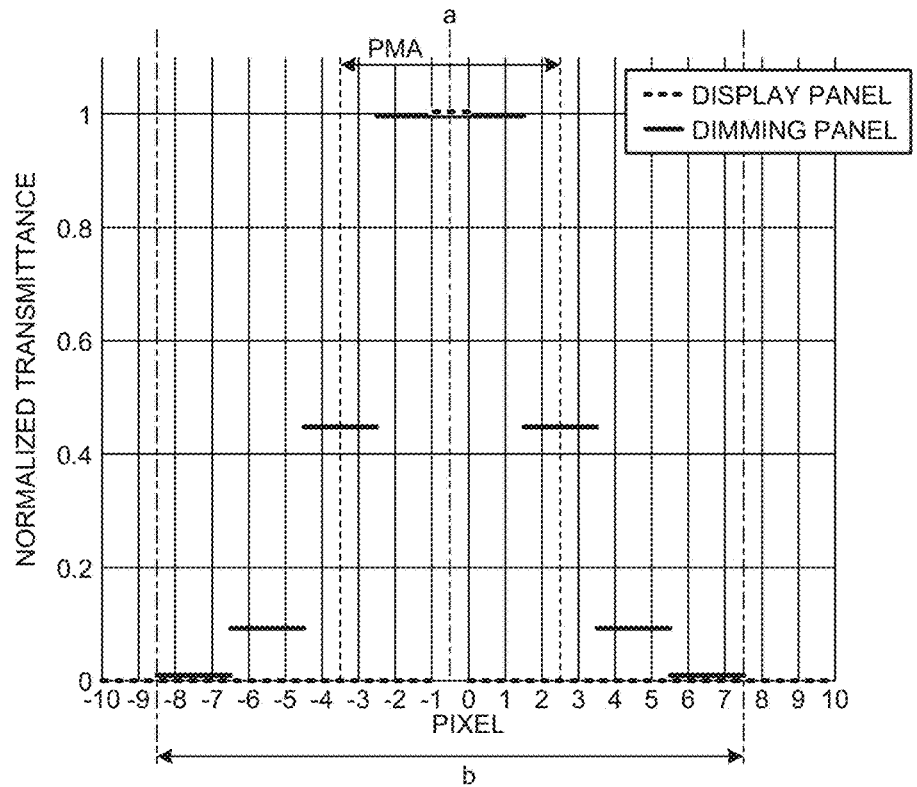
FIG. 40 is a graph illustrating an exemplary correspondence relation between the normalized transmittance of the pixel and the normalized transmittance of the dimming pixels when the third process is applied.

FIG. 38 is a graph illustrating an exemplary correspondence relation between the normalized transmittance of the pixel 48 and the normalized transmittance of the dimming pixels 148 when the first process is applied. FIG. 39 is a graph illustrating an exemplary correspondence relation between the normalized transmittance of the pixel 48 and the normalized transmittance of the dimming pixels 148 when the second process is applied. FIG. 40 is a graph illustrating an exemplary correspondence relation between the normalized transmittance of the pixel 48 and the normalized transmittance of the dimming pixels 148 when the third process is applied. The examples illustrated in FIGS. 38, 39, and 40 are the same as the examples illustrated in FIGS. 35, 36, and 37, except that the positional misalignment GA is as large as half the pixel 48. Even when the positional misalignment GA is as large as half the pixel 48, when the pixels 48 and the dimming pixels 148 are in the q-to-one relation, each of the first, the second, and the third processes is the same as those described with reference to FIGS. 35, 36, and 37, as illustrated in FIGS. 38, 39, and 40. Thus, the normalized transmittance of the dimming pixel 148 in the position overlapping the pixel 48 having a normalized transmittance of 1 on the display panel 30 is approximately 0.67 in the example illustrated in FIG. 34, but is approximately 0.8 in the examples illustrated in FIGS. 38 and 39, and is 1 in the example illustrated in FIG. 40. Thus, the first, the second, or the third processes can reduce the insufficiency in intensity of the light. In the example illustrated in FIG. 40, the third process extends the negative side of the portion on the dimming panel where the normalized transmittance is 1 to the position at −2.5.

While the case has been described where the "first arrangement" in FIG. 31 is assumed as the positional relation between the pixels 48 and the dimming pixels 148 with no positional misalignment GA, a case can also be considered where the "second arrangement" is assumed as the positional relation between the pixels 48 and the dimming pixels 148 with no positional misalignment GA. The following describes this case with reference to FIGS. 41 to 46.

Figure 41:
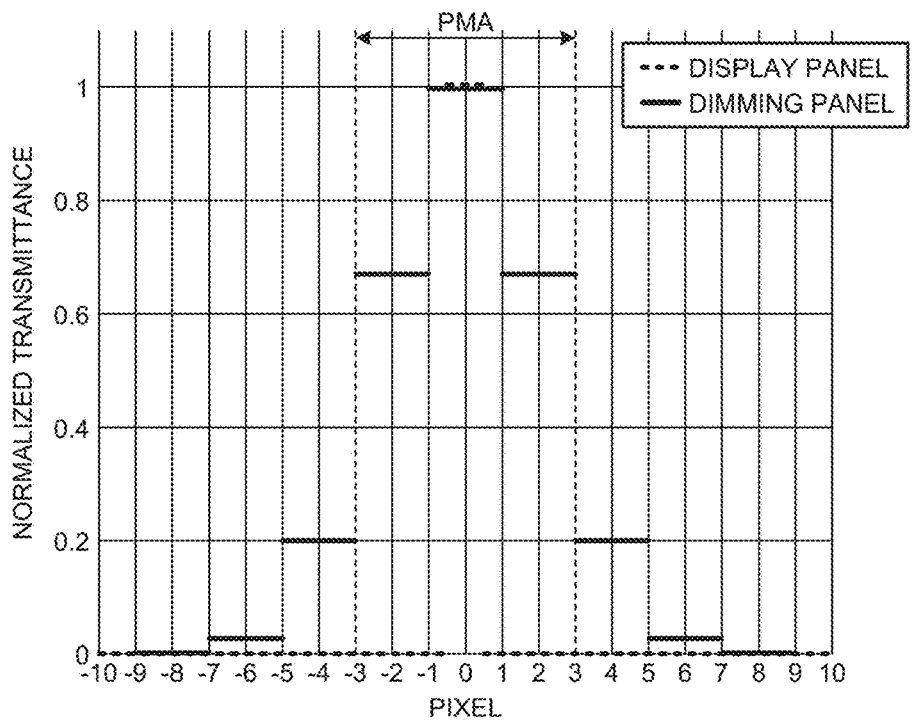
FIG. 41 is a graph illustrating an exemplary correspondence relation between the normalized transmittance of the pixel and the normalized transmittance of the dimming pixels corresponding to the ideal positional relation between the display panel and the dimming panel on the assumption that no positional misalignment is present, when the pixel having a normalized transmittance of 1 is located in the center of the dimming pixel overlapping the pixel as the positional relation in the horizontal axis direction.

FIG. 41 is a graph illustrating an exemplary correspondence relation between the normalized transmittance of the pixel 48 and the normalized transmittance of the dimming pixels 148 corresponding to the ideal positional relation between the display panel 30 and the dimming panel 80 on the assumption that no positional misalignment GA is present, when the pixel 48 having a normalized transmittance of 1 is located in the center of the dimming pixel 148 overlapping the pixel 48 as the positional relation in the horizontal axis direction. In the examples illustrated in FIG. 41 and FIGS. 42 and 43 to be described later, none of the first, the second, and the third processes is applied.

In the example illustrated in FIG. 41, the pixel 48 having a normalized transmittance of 1 is located in the center of the dimming pixel 148 that overlaps the pixel 48. Therefore, the normalized transmittance of the dimming pixel 148 is symmetrical between the positive and negative sides, and the normalized transmittance of the dimming pixels 148 is achieved that follows a more ideal Gaussian function curve having the highest point (a) at the pixel 48 having a normalized transmittance of 1.

Figure 42:
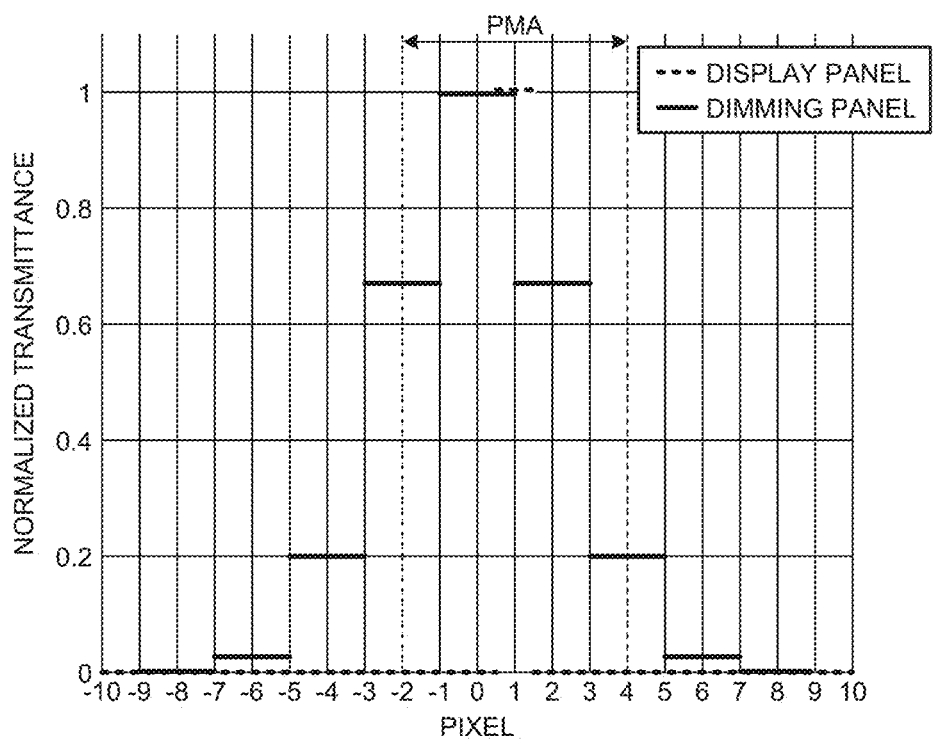
FIG. 42 is a graph illustrating an exemplary correspondence relation between the normalized transmittance of the pixel and the normalized transmittance of the dimming pixels when the misalignment occurs by one pixel.
Figure 43:
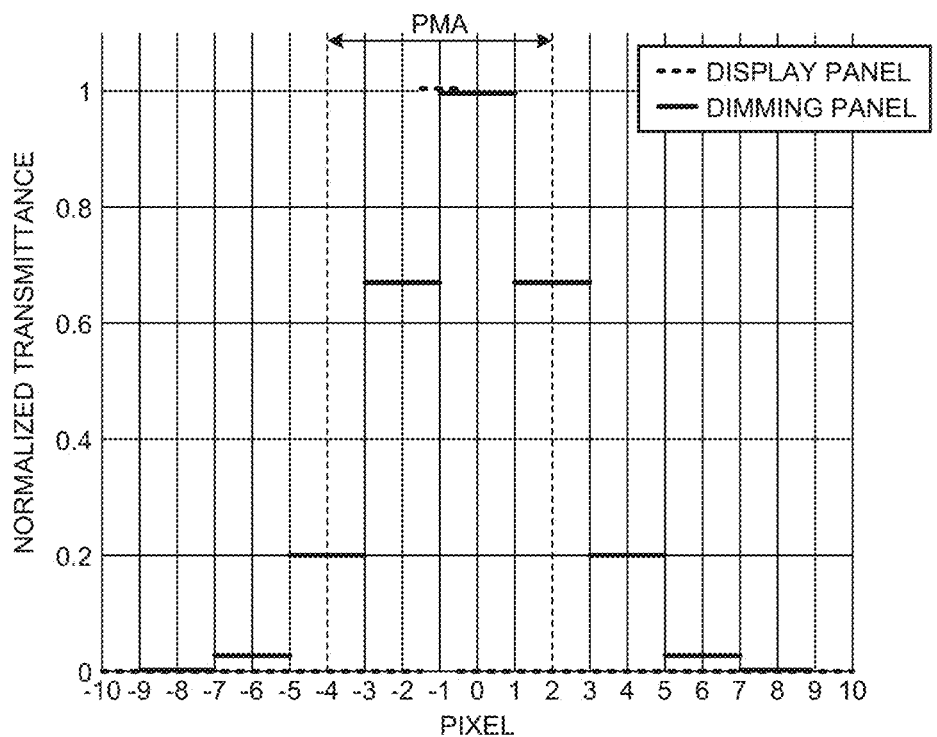
FIG. 43 is a graph illustrating another exemplary correspondence relation between the normalized transmittance of the pixel and the normalized transmittance of the dimming pixels when the misalignment occurs by one pixel.

FIG. 42 is a graph illustrating an exemplary correspondence relation between the normalized transmittance of the pixel 48 and the normalized transmittance of the dimming pixels 148 when the misalignment occurs by one pixel 48. FIG. 43 is a graph illustrating another exemplary correspondence relation between the normalized transmittance of the pixel 48 and the normalized transmittance of the dimming pixels 148 when the misalignment occurs by one pixel 48. The positional relation between the pixel 48 and the dimming pixels 148 caused by the occurrence of the positional misalignment GA is reversed between FIGS. 42 and 43.

In the example described with reference to FIG. 41, the normalized transmittance of the dimming pixels 148 is achieved that follows the more ideal Gaussian function curve having the highest point (a) at the pixel 48 having a normalized transmittance of 1. Therefore, the degree of imbalance in the normalized transmittance between the pixel 48 having a normalized transmittance of 1 and the dimming pixels 148 is the same between FIGS. 42 and 43, except that the direction of the positional misalignment GA and the direction of insufficiency of brightness differ between FIGS. 42 and 43. In this case, the first, the second, or the third process may be applied if the misalignment is by one pixel 48 or more in either direction, or the first, the second, or the third process may be refrained from being applied if the misalignment is by up to one pixel 48 in either direction. The following sequentially describes cases in each of which the first, the second, or the third process is applied to the example in FIG. 43, with reference to FIG. 44 to 46.

Figure 44:
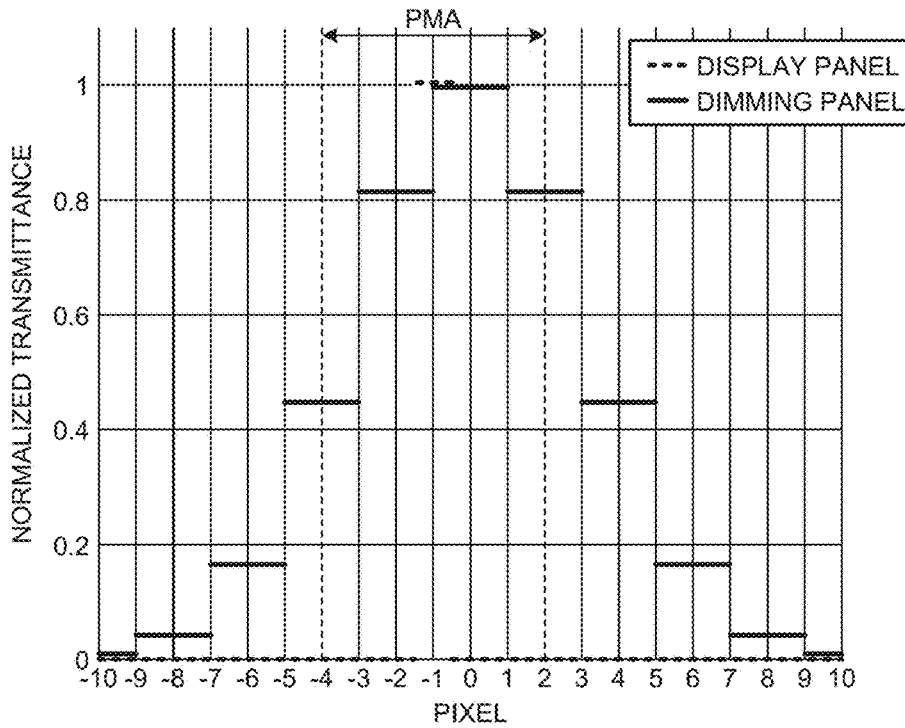
FIG. 44 is a graph illustrating an exemplary correspondence relation between the normalized transmittance of the pixel and the normalized transmittance of the dimming pixels when the first process is applied to the example illustrated in FIG. 43.

FIG. 44 is a graph illustrating an exemplary correspondence relation between the normalized transmittance of the pixel 48 and the normalized transmittance of the dimming pixels 148 when the first process is applied to the example illustrated in FIG. 43. In the luminance profiles illustrated in FIGS. 41 to 43, the width of the spread (b) of the Gaussian function curve is approximately ±7. In contrast, in the example illustrated in FIG. 44, the application of the first process expands the spread (b) to positions where the width exceeds ±10. As a result, in the example illustrated in FIG. 44, the normalized transmittance of the dimming pixel 148 that is located at +3 (dashed line position in the central area PMA) when viewed from the pixel 48 having a normalized transmittance of 1 is made close to 0.4. Thus, the application of the first process can reduce the insufficiency in the normalized transmittance of the dimming pixel 148 that would be caused by the positional misalignment GA. Thus, the first process reduces the insufficiency in intensity of the light that would be caused by the positional misalignment GA. In the example illustrated in FIG. 43, the normalized transmittance of the dimming pixel 148 in the position overlapping the pixel 48 having a normalized transmittance of 1 on the display panel 30 is approximately 0.67. In contrast, in the example illustrated in FIG. 44, the normalized transmittance of the dimming pixel 148 in the position overlapping the pixel 48 having a normalized transmittance of 1 on the display panel 30 is approximately 0.8. Thus, the first process can reduce the insufficiency in intensity of the light.

Figure 45:
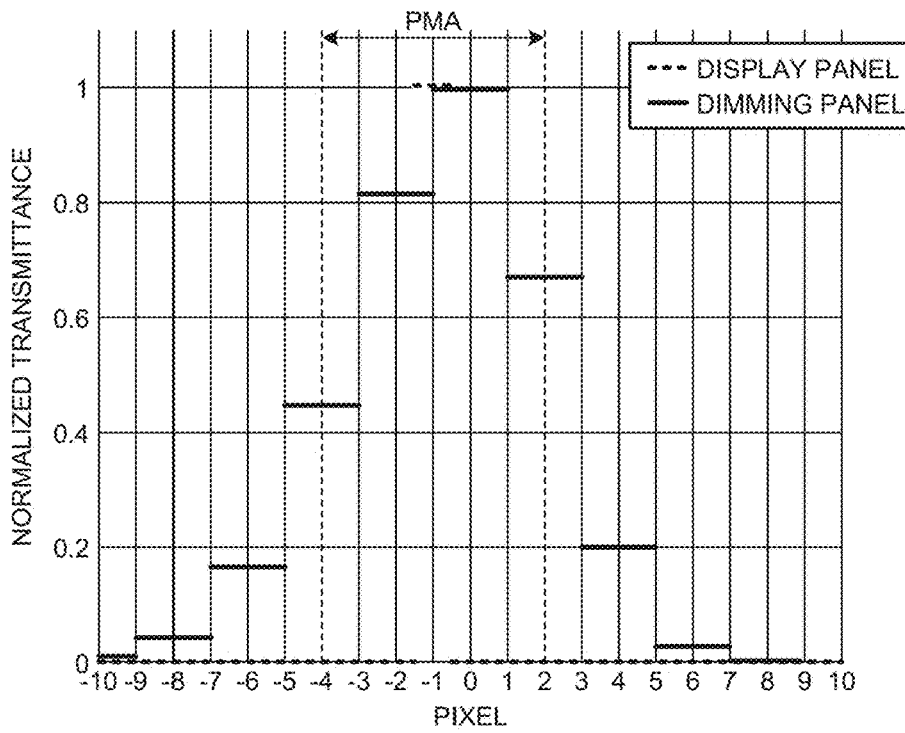
FIG. 45 is a graph illustrating an exemplary correspondence relation between the normalized transmittance of the pixel and the normalized transmittance of the dimming pixels when the second process is applied to the example illustrated in FIG. 43.

FIG. 45 is a graph illustrating an exemplary correspondence relation between the normalized transmittance of the pixel 48 and the normalized transmittance of the dimming pixels 148 when the second process is applied to the example illustrated in FIG. 43. In the luminance profiles illustrated in FIGS. 41 to 43, the width of the spread (b) of the Gaussian function curve on the negative side spans to the position near −7. In contrast, in the example illustrated in FIG. 45, according to the same concept as in the example of $b_{21}$ described above, the application of the second process widens the width of the spread (b) of the Gaussian function curve on the negative side to a position near −10. As a result, in the example illustrated in FIG. 45, the normalized transmittance of the dimming pixel 148 that is located at −3 when viewed from the pixel 48 having a normalized transmittance of 1 is made close to 0.4. Thus, the application of the second process can reduce the insufficiency in the normalized transmittance of the dimming pixel 148 that would be caused by the positional misalignment GA. Thus, the second process reduces the insufficiency in intensity of the light that would be caused by the positional misalignment GA. In the example illustrated in FIG. 43, the normalized transmittance of the dimming pixel 148 in the position overlapping the pixel 48 having a normalized transmittance of 1 on the display panel 30 is approximately 0.67. In contrast, in the example illustrated in FIG. 45, the normalized transmittance of the dimming pixel 148 in the position overlapping the pixel 48 having a normalized transmittance of 1 on the display panel 30 is approximately 0.8. Thus, the second process can reduce the insufficiency in intensity of the light.

Figure 46:
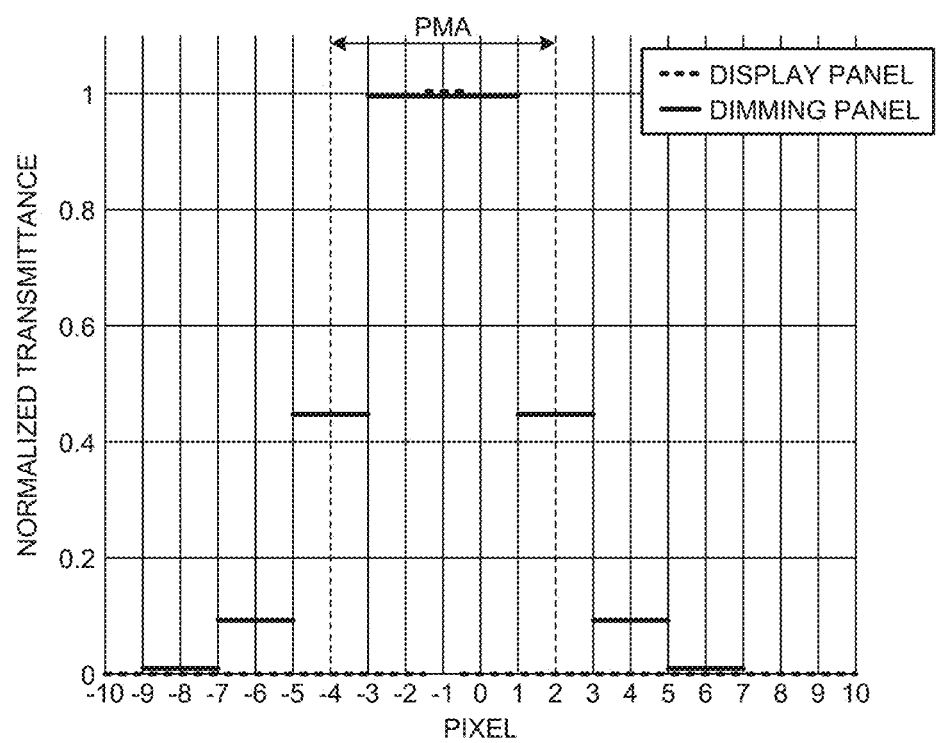
FIG. 46 is a graph illustrating an exemplary correspondence relation between the normalized transmittance of the pixel and the normalized transmittance of the dimming pixels when the third process is applied to the example illustrated in FIG. 43.

FIG. 46 is a graph illustrating an exemplary correspondence relation between the normalized transmittance of the pixel 48 and the normalized transmittance of the dimming pixels 148 when the third process is applied to the example illustrated in FIG. 43. As described above, when the third process is applied, the signal processing circuit 10 obtains the normalized transmittance of each of the dimming pixels 148 by setting the highest point (a) at a location corresponding to the value of the positional misalignment GA and applying the spread (b) of the Gaussian function curve of the luminance profile, and controls the degree of transmission of light of each of the dimming pixels 148 correspondingly to the obtained normalized transmittance. As a result, the normalized transmittance of the dimming pixels 148 illustrated in FIG. 43 is different from the normalized transmittance of the dimming pixels 148 illustrated in FIG. 46. However, considering the distribution (curvature) of the Gaussian function curve traced by the normalized transmittance of the dimming pixels 148, the relations between the highest point (a) and the spread (b) in the normalized transmittance of the dimming pixels 148 are substantially identical to each other. That is, even when the positional misalignment GA occurs, the third process can ensure substantially the same brightness as that when no positional misalignment GA occurs. Thus, the third process reduces the insufficiency in intensity of the light that would be caused by the positional misalignment GA. In the example illustrated in FIG. 43, the normalized transmittance of the dimming pixel 148 in the position overlapping the pixel 48 having a normalized transmittance of 1 on the display panel 30 is approximately 0.67. In contrast, in the example illustrated in FIG. 46, the normalized transmittance of the dimming pixel 148 in the position overlapping the pixel 48 having a normalized transmittance of 1 on the display panel 30 is 1. Thus, the third process can reduce the insufficiency in intensity of the light.

As described above, according to the embodiment, the display device 1 includes the display panel 30 that has the display area OA in which the pixels 48 are arranged, the dimming panel 80 that is disposed on one surface side of the display panel 30 so as to face the display panel 30 and has the dimming area DA in which the dimming pixels 148 are arranged, and the light source (light source device 50) that emits the light that travels from the dimming panel 80 toward the display panel 30. When the pixel 48 is controlled to be lit up in white in accordance with the received image signal (input signal IP), the blurring processing is applied so as to cause more than one of the dimming pixels 148 including a dimming pixel 148 overlapping the pixel 48 to transmit the light; the blurring area BLU serving as an area including the more than one of the dimming pixels 148 to which the blurring processing is applied is formed; and the light from the light source is transmitted through the blurring area BLU and the pixel 48 to the other surface side of the display panel 30. The blurring area BLU is determined based on the positional misalignment GA with respect to the predetermined positional relation between the display area OA and the dimming area DA. As a result, when the positional misalignment GA occurs, the blurring area BLU is formed taking into account the positional misalignment GA. Thus, the lack of brightness can be reduced from occurring.

When the first process described above is applied, the blurring area BLU is widened as the positional misalignment GA increases. As a result, the widening of the blurring area BLU can compensate for the positional misalignment of the blurring area BLU by the amount of the positional misalignment GA. Thus, the lack of brightness can be restrained from occurring.

The luminance distribution of the blurring area BLU corresponds to a function curve having the highest point (a) at the dimming pixel 148 having the highest degree of transmission of light. When the first process described above is applied, the spread (b) of the function curve increases as the positional misalignment GA increases. As a result, the lack of brightness can be more reliably restrained from occurring.

When the second process is applied, the blurring area BLU has a larger spread on one side than on the other side with the highest point (a) interposed therebetween, the other side being a side located in a direction in which the dimming area DA is misaligned with respect to the display area OA. This process can improve the spread on the one side where the brightness is insufficient due to the positional misalignment GA, that is, the number of the dimming pixels 148 controlled to transmit light on the one side and the degree of transmission of light by the dimming pixels 148 on the one side. Thus, the lack of brightness can be restrained from occurring.

When the second process is applied, the spread on the one side of the function curve increases as the positional misalignment GA increases. As a result, the lack of brightness can be more reliably restrained from occurring.

The blurring area BLU is positioned based on the positional misalignment GA so that the dimming pixel 148 having the highest degree of transmission of light in the blurring area BLU overlaps the pixel 48 controlled to be lit up in white. This positioning can achieve the placement of the blurring area BLU according to the positional misalignment GA. Thus, the lack of brightness can be restrained from occurring. The luminance distribution of the blurred area BLU centered on the pixel 48 controlled to be lit up in white can be easily made symmetrical with respect to the direction of occurrence of the positional misalignment GA.

When the pixel 48 controlled to be lit up in white is located in the middle between the adjacent dimming pixels 148, more than one of the dimming pixels 148 having the highest degree of transmission of light in the blurring area BLU are set in the direction of the positional misalignment. As a result, the luminance distribution of the blurred area BLU centered on the pixel 48 controlled to be lit up in white can be more reliably made symmetrical with respect to the direction of occurrence of the positional misalignment GA.

By making the dimming area DA larger than the display area OA, the entire display area OA is made easier to be covered with the dimming area DA even if the positional misalignment GA occurs.

The ratio of the resolution per unit area of the pixels 48 to the resolution per unit area of the dimming pixels 148 is q to 1, where q is a natural number equal to or larger than 2. Thus, the cost of the dimming panel 80 can be reduced because, for example, the resolution of the dimming panel 80 can be made lower and the processing load on the dimming panel driver 140 can be reduced.

Other operational advantages accruing from the aspects described in the embodiment that are obvious from the description herein, or that are conceivable as appropriate by those skilled in the art will naturally be understood as accruing from the present disclosure.

What is claimed is:
1. A display device comprising:
  a display panel that has a display area in which a plurality of pixels are arranged;
  a dimming panel that is disposed on one surface side of the display panel so as to face the display panel and has a dimming area in which a plurality of dimming pixels are arranged; and
  a light source configured to emit light that travels from the dimming panel toward the display panel, wherein
  when a pixel among the plurality of pixels is controlled to be lit up in white in accordance with a received image signal, blurring processing is applied so as to cause more than one of the plurality of dimming pixels including a dimming pixel overlapping the pixel to transmit light; a blurring area serving as an area including the more than one of the plurality of dimming pixels to which the blurring processing is applied is formed; and light from the light source is transmitted through the blurring area and the pixel to the other surface side of the display panel, and
  the blurring area is determined based on a positional misalignment with respect to a predetermined positional relation between the display area and the dimming area.

2. The display device according to claim 1, wherein the blurring area is widened as the positional misalignment increases.

3. The display device according to claim 2, wherein
  a luminance distribution of the blurring area corresponds to a function curve having a highest point at one of the plurality of dimming pixels that has a highest degree of transmission of light, and
  a spread of the function curve increases as the positional misalignment increases.

4. The display device according to claim 1, wherein
  a luminance distribution of the blurring area corresponds to a function curve having a highest point at one of the plurality of dimming pixels that has a highest degree of transmission of light,
  the blurring area has a larger spread on one side than on the other side with the highest point interposed between the one side and the other side, and
  the other side is a side located in a direction in which the dimming area is misaligned with respect to the display area.

5. The display device according to claim 4, wherein the spread on the one side of the function curve increases as the positional misalignment increases.

6. The display device according to claim 1, wherein the blurring area is positioned based on the positional misalignment so that one of the plurality of dimming pixels that has a highest degree of transmission of light in the blurring area overlaps the pixel controlled to be lit up in white.

7. The display device according to claim 6, wherein, when the pixel controlled to be lit up in white is located in a middle between adjacent dimming pixels among the plurality of dimming pixels due to the positional misalignment, more than one of the plurality of dimming pixels having the highest degree of transmission of light in the blurring area are set in a direction of the positional misalignment.

8. The display device according to claim 1, wherein the dimming area is larger the display area.

9. The display device according to claim 1, wherein
a ratio of a resolution per unit area of the pixels to a resolution per unit area of the dimming pixels is q to 1, and
q is a natural number equal to or larger than 2.

* * * * *